US010259003B2

(12) United States Patent
Dhir

(10) Patent No.: US 10,259,003 B2
(45) Date of Patent: Apr. 16, 2019

(54) OMEGA-3 SPRAY

(71) Applicant: The Plant Based Company, Venice, CA (US)

(72) Inventor: Rajat Dhir, Los Angeles, CA (US)

(73) Assignee: The Plant Based Company, Venice, CA (US)

( * ) Notice: Subject to any disclaimer, the term of this patent is extended or adjusted under 35 U.S.C. 154(b) by 0 days.

(21) Appl. No.: 15/836,047

(22) Filed: Dec. 8, 2017

(65) Prior Publication Data

US 2018/0093287 A1   Apr. 5, 2018

Related U.S. Application Data

(63) Continuation of application No. PCT/US2016/037683, filed on Jun. 15, 2016.
(Continued)

(51) Int. Cl.
*B05B 11/00* (2006.01)
*B65D 47/00* (2006.01)
(Continued)

(52) U.S. Cl.
CPC ...... *B05B 11/3039* (2013.01); *B05B 11/0072* (2013.01); *B05B 11/00412* (2018.08);
(Continued)

(58) Field of Classification Search
CPC ............. B05B 11/3038; B05B 11/3039; B05B 11/304; B05B 11/0072
See application file for complete search history.

(56) References Cited

U.S. PATENT DOCUMENTS 2,593,591 A * 4/1952 Menkin ............... B05B 11/3001
  222/205
4,022,354 A * 5/1977 Kotuby ................. B05B 11/304
  222/321.2
(Continued)

FOREIGN PATENT DOCUMENTS

WO   WO-2016205408 A1   12/2016

OTHER PUBLICATIONS

"63. Dietary supplementation with n-3 polyunsaturated fatty acids and vitamin E after myocardial infarction: results of the GISSI-Prevenzione trial", Gruppo Italiano per lo Studio della Sopravvivenza nell'Infarto miocardico. Lancet. 1999; 354, (1999), 447-455.
(Continued)

*Primary Examiner* — J C Jacyna
(74) *Attorney, Agent, or Firm* — Schwegman Lundberg & Woessner, P.A.

(57) ABSTRACT

A pump assembly cap includes an accumulator reservoir configured for fluid communication with a container through a one-way inlet valve. An actuator including a dispensing passage having a dispensing orifice. A delivery path extended from the one-way inlet valve, through the accumulator reservoir, the one-way outlet valve, and to the dispensing orifice. The delivery path includes a sealed configuration and an opened configuration. In the sealed configuration, the actuator is in a ready position and the accumulator reservoir includes a first volume, the one-way outlet valve hermetically seals the accumulator reservoir, and the one-way inlet valve is closed. In the opened configuration, the actuator is moved to a dispensing position and the accumulator reservoir includes a second volume less than the first volume, the hermetic seal of the one-way outlet is open, and the one-way inlet valve is closed.

26 Claims, 4 Drawing Sheets

Related U.S. Application Data

(60) Provisional application No. 62/175,934, filed on Jun. 15, 2015.

(51) Int. Cl.
  *B05C 17/005* (2006.01)
  *A23K 20/158* (2016.01)
  *A23D 7/00* (2006.01)

(52) U.S. Cl.
  CPC ........ *B05B 11/304* (2013.01); *B05B 11/3008* (2013.01); *B05B 11/3043* (2013.01); *B05C 17/005* (2013.01); *B65D 47/00* (2013.01); *A23D 7/003* (2013.01); *A23K 20/158* (2016.05); *B05B 11/0037* (2013.01); *B05B 11/0089* (2013.01); *B05B 11/303* (2013.01); *B05B 11/3047* (2013.01)

(56) References Cited

U.S. PATENT DOCUMENTS

| | | | | |
|---|---|---|---|---|
| 4,079,865 | A | * | 3/1978 | Kutik ................. B05B 11/3015 222/259 |
| 2004/0000567 | A1 | * | 1/2004 | Greiner-Perth ..... B05B 11/3039 222/321.1 |
| 2006/0243750 | A1 | | 11/2006 | Pietrowski et al. |
| 2008/0121664 | A1 | * | 5/2008 | Ophardt .............. B05B 11/3001 222/321.9 |
| 2010/0294805 | A1 | | 11/2010 | Pohlmann et al. |
| 2014/0252129 | A1 | * | 9/2014 | Durruty Ortega ... B65D 83/752 239/337 |
| 2015/0296957 | A1 | * | 10/2015 | Megaro ................ A45D 34/041 132/200 |

OTHER PUBLICATIONS

"Application for the Approval of DHA-Rich Algal Oil from Schizochytrium sp. (DHA-B) as a Novel Food Ingredient under Regulation (EC) No. 258/97 of the European Parliament and of the Council of Jan. 27, 1997 Concerning Novel Foods and Novel Food Ingredients", DSM Nutritional Products, (Sep. 4, 2013), 76 pgs.
"Fish: Friend or Foe", The Nutrition Source. Harvard School of Public Health, (accessed Dec. 17, 2016), 6 pgs.
"Higher Levels of Omega-3 in Diet Associated with Better Sleep", News & Events. University of Oxford, (Mar. 6, 2014), 2 pgs.
"International Application Serial No. PCT/US2016/037683, International Preliminary Report on Patentability dated Dec. 28, 2017", 8 pgs.
"International Application Serial No. PCT/US2016/037683, International Search Report dated Sep. 2, 2016", 2 pgs.
"International Application Serial No. PCT/US2016/037683, Written Opinion dated Sep. 2, 2016", 6 pgs.
"Low Omega-3 Could Explain Why Some Children Struggle with Reading", University of Oxford, (Sep. 5, 2013), 2 pgs.
"Manufacturing Process of—DHA Algal Oil", 1 pg.
"Omega-3 Fatty Acids: An Essential Contribution", The Nutrition Source. Harvard School of Public Health, (2014), 5 pgs.
"Scientific Opinion on the extension of use for DHA and EPA-rich algal oil from Schizochytrium sp. as a Novel Food ingredient1", EFSA Journal 2014;12(10):3843, (2014), 17 pgs.
Ahmad, A., et al., "Decrease in neuron size in docosahexaenoic acid-deficient brain", Pediatr. Neurol. 26, (2002), 210-218.
Auestad, N., et al., "Dietary n-3 fatty acid restriction during gestation in rats: neuronal cell body and growth-cone fatty acids", . Am. J. Clin. Nutr. 71, (2000), 312S-314S.
Beltz, B.S., et al., "Omega-3 fatty acids upregulate adult neurogenesis", Neurosci. Lett. 415, (2007), 154-158.
Blondeau, N, et al., "Polyunsaturated fatty acids are cerebral vasodilators via the TREK-1 potassium channel", Circ Res. Jul. 20, 2007;101(2), (2007), 176-184.
Bongiovanni, K.D., et al., "Neonatal growth rate and development of mice raised on milk transgenically enriched with Omega-3 fatty acids.", Pediatr. Res. 62, (2007), 412-416.
Bordoni, A., et al., "Polyunsaturated fatty acids: from diet to binding to ppars and other nuclear receptors", Genes Nutr. 1,10.1007/BF02829951, (2006), 95-106.
Bozcali, E, et al., "Omega-3 fatty acid treatment in cardiac syndrome X: a double-blind, randomized, placebo-controlled clinical study", Coron Artery Dis. Jun. 2013;24(4), (2013), 328-333.
Calderon, F., et al., "Docosahexaenoic acid promotes neurite growth in hippocampal neurons", . J. Neurochem. 90, 10.1111/j.1471-4159.2004.02808.x, (2004), 979-988.
Cansev, M., et al., "Chronic administration of docosahexaenoic acid or eicosapentaenoic acid, but not arachidonic acid, alone or in combination with uridine, increases brain phosphatide and synaptic protein levels in gerbils", Neuroscience 148, 421-43110.1016/j.neuroscience.2007.06.016, (2007), 19 pgs.
Castillo, Michelle, "High Levels of Omega-3 Fatty Acids Linked to Larger Brain volume in Older Adults", CBSNews. CBS Interactive, (Jan. 22, 2014), 3 pgs.
Chang, C.-Y., et al., "Essential fatty acids and human brain", Acta Neurol. Taiwan. 18, (2009), 231-241.
Chiu, CC, et al., "The effects of Omega-3 fatty acids monotherapy in Alzheimer's disease and mild cognitive impairment: a preliminary randomized double-blind placebo-controlled study", Progress in neuro-psychopharmacology & biological psychiatry 32:doi:10.1016/j.pnpbp.2008.05.015, (2008), 1538-1544.
Chung, W.L., et al., "Fish oil supplementation of control and (n-3) fatty acid-deficient male rats enhances reference and working memory performance and increases brain regional docosahexaenoic acid levels", J. Nutr. 138, (2008), 1165-1171.
Cockburn, F, "Neonatal brain and dietary lipids", Arch. Dis. Child. 70.10.1136/adc.70.5.369, (1994), F1-F2.
Coluccia, A., et al., "Developmental Omega-3 supplementation improves motor skills in juvenile-adult rats", Int. J. Dev. Neurosci. 27,10.1016/j.ijdevneu.2009.05.011, (2009), 599-605.
Coo, D., "Docosahexaenoic acid promotes hippocampal neuronal development and synaptic function. J. Neurochem", J. Neurochem. 111, 10.1111/j.1471-4159.2009.06300.x, (2009), 510-521.
Coti Bertrand, P., et al., "Maternal dietary (n-3) fatty acid deficiency alters neurogenesis in the embryonic rat brain", J. Nutr. 136, (2006), 1570-1575.
Da Costa, K.-A., et al., "). Dietary docosahexaenoic acid supplementation modulates hippocampal development in the Pemt−/− mouse", J. Biol. Chem. 285. 10.1074/jbc.M109.017137, (2009), 1008-1015.
Dagai, L., et al., "Docosahexaenoic acid significantly stimulates immediate early response genes and neurite outgrowth", Neurochem. Res. 34, 10.1007/s11064-008-9845-z, (2009), 867-875.
Disalvo, David, "New Study Shows That Omega-3 Supplements Can Boost Memory in Young Adults", Forbes. Forbes Magazine, (Oct. 29, 2012), 2 pgs.
Eilander, A, et al., "Effects of n-3 long chain polyunsaturated fatty acid supplementation on visual and cognitive development throughout childhood: a review of human studies", Prostaglandins Leukot Essent Fatty Acids. 2007; 76, (2007), 189-203.
Estrada, Andrea, "Hold the Mayo", The UCSB Current. University of California Santa Barbara, (Sep. 9, 2014), 3 pgs.
Fedorova, I., et al., "An n-3 fatty acid deficiency impairs rat spatial learning in the Barnes maze. Behav. Neurosci", Behav. Neurosci. 123,10.1037/a0013801, (2009), 196-205.
Fernstrom, J.D., "Effects of dietary polyunsaturated fatty acids on neuronal function", Lipids 34,10.1007/s11745-999-0350-3, (1999), 161-169.
Freund-Levi, Y., et al., "Omega-3 fatty acid treatment in 174 patients with mild to moderate Alzheimer disease: OmegAD study: a randomized double-blind trial", Archives of neurology 63: doi: 10.1001/archneur.63.10.1402, (2008), 1402-1408.
Freund-Levi, Y., et al., "Omega-3 supplementation in mild to moderate Alzheimer's disease: effects on neuropsychiatric symptoms", International journal of geriatric psychiatry 23:doi: 10.1002/gps.1857, (2008), 161-169.

(56) References Cited

OTHER PUBLICATIONS

Garcia-Calatayud, S., et al., "Brain docosahexaenoic acid status and learning in young rats submitted to dietary long-chain polyunsaturated fatty acid deficiency and supplementation limited to lactation", . Pediatr. Res. 57,10.1203/01.PDR.0000156506.03057.AD, (2005), 719-723.
Grandjean, P, et al., "Cognitive deficit in 7-year-old children with prenatal exposure to methylmercury", Neurotoxicol Teratol. 1997; 19, (1997), 417-428.
Greiner, R.S., "Rats with low levels of brain docosahexaenoic acid show impaired performance in olfactory-based and spatial learning tasks", . Lipids 34(Suppl.),10.1007/BF02562305, (1999), S239-S243.
Hara, M, et al., "Low levels of serum n-3 polyunsaturated fatty acids are associated with worse heart failure-free survival in patients after acute myocardial infarction", Circ J. 2013;77(1), (2013), 153-162.
Hashi, T, et al., "Omega-3 fatty acids lower blood pressure by directly activating large-conductance Ca(2)(+)-dependent K(+) channels", Proc Natl Acad Sci USA. Mar. 19, 2013;110(12), (2013), 4816-4821.
Hayakawa, S, et al., "Association of plasma Omega-3 to omega-6 polyunsaturated fatty acid ratio with complexity of coronary artery lesion", Intern Med. 2012;51(9), (2012), 1009-1014.
He, C., et al., "Improved spatial learning performance of fat-1 mice is associated with enhanced neurogenesis and neuritogenesis by docosahexaenoic acid", Proc. Natl. Acad. Sci. U.S.A. 106, 10.1073/pnas.0906923106, (2009), 11370-11375.
Hoffman, D.R., et al., "Toward optimizing vision and cognition in term infants by dietary docosahexaenoic and arachidonic acid supplementation: a review of randomized controlled trials", Prostaglandins Leukot. Essent. Fatty Acids 81,10.1016/j.plefa.2009.05.003, (2009), 151-158.
Holguin, S., et al., "Chronic administration of DHA and UMP improves the impaired memory of environmentally impoverished rats", Behav. Brain Res. 191,10.1016/j.bbr.2008.02.042, (2008), 11-16.
Hooijmans, C.R., et al., "DHA and cholesterol containing diets influence Alzheimer-like pathology, cognition and cerebral vasculature in APPswe/PS1dE9 mice", Neurobiol. Dis. 33,10.1016/j.nbd.2008.12.002, (2009), 482-498.
Huang, T, et al., "Associations of plasma n-3 polyunsaturated fatty acids with blood pressure and cardiovascular risk factors among Chinese", Int J Food Sci Nutr. Sep. 2012;63(6), (2012), 667-673.
Issa, A.M., et al., "The efficacy of Omega-3 fatty acids on cognitive function in aging and dementia: a systematic review", . Dement. Geriatr. Cogn. Disord. 21,10.1159/000090224, (2006), 88-96.
Jamieson, E.C., et al., "Infant cerebellar gray and white matter fatty acids in relation to age and diet", Lipids 34, (1999), 1065-1071.
Jiang, L.-H., et al., "The influence of orally administered docosahexaenoic acid on cognitive ability in aged mice", Nutr. Biochem. 20,10.1016/j.jnutbio.2008.08.004, (2009), 735-741.
Karalek, DO, et al., "A prospective study of dietary alpha-linolenic acid and the risk of prostate cancer (United States)", Cancer Causes Control. 2006; 17, (2006), 783-791.
Kidd, PM, "Omega-3 DHA and EPA for cognition, behavior, and mood: clinical findings and structural-functional synergies with cell membrane phospholipids", Altern Med Rev. Sep. 2007;12(3), (2007), 207-227.
Kitajka, K., et al., "The role of n-3 polyunsaturated fatty acids in brain: modulation of rat brain gene expression by dietary n-3 fatty acids", Proc. Natl. Acad. Sci. U.S.A. 99,10.1073/pnas.042698699, (2002), 2619-2624.
Kris-Etherton, PM, et al., "Fish consumption, fish oil, Omega-3 fatty acids, and cardiovascular disease", Circulation. 2002; 106, (2002), 2747-2757.
Kumosani, T.A., et al., "Modulatory effect of cod-liver oil on Na(+)-K(+) ATPase in rats' brain", Hum. Exp. Toxicol. 30,10.1177/0960327110371699, (2011), 267-274.

Lassek, WD, et al., "Sex Differences in the Relationship of Dietary Fatty Acids to Cognitive Measures in American Children", Frontiers in Evolutionary Neuroscience, 2011; doi:10.3389/fnevo.2011.00005, (2011), 3-5.
Leaf, A., "Prevention of sudden cardiac death by n-3 polyunsaturated fatty acids", J Cardiovasc Med. (Hagerstown). 2007; 8 Suppl 1, (2007), S27-S29.
Leitzmann, MF, et al., "Dietary intake of n-3 and n-6 fatty acids and the risk of prostate cancer", Am J Clin Nutr. 2004; 80, (2004), 204-216.
Leung, B.M., et al., "Does prenatal micronutrient supplementation improve children's mental development? A systematic review", BMC Pregnancy Childbirth 11,10.1186/1471-2393-11-12, (2011), 12 pgs.
Lim, S.-Y., et al., "N-3 fatty acid deficiency induced by a modified artificial rearing method leads to poorer performance in spatial learning tasks", Pediatr. Res. 58, 741-74810.1203/01.PDR.0000180547.46725.CC, (2005), 8 pgs.
Liu, J.-W., et al., "Expression of E-FABP in PC12 cells increases neurite extension during differentiation: involvement of n-3 and n-6 fatty acids", J. Neurochem. 106, 10.1111/j.1471-4159.2008.05411.x, (2008), 2015-2029.
Maillet, D., et al., "Relationship between n-3 PUFA content and energy metabolism in the flight muscles of a migrating shorebird: evidence for natural doping", . J. Exp. Biol. 210,10.1242/jeb.02660, (2007), 413-420.
Marik, PE, "Omega-3 dietary supplements and the risk of cardiovascular events: a systematic review", Clin Cardiol. Jul. 2009;32(7), (2009), 365-372.
Mazaffarian, D, ". Fish intake, contaminants, and human health: evaluating the risks and the benefits", . JAMA. 2006; 296, (2006), 1885-1899.
Mazaffarian, D, et al., "Interplay between different polyunsaturated fatty acids and risk of coronary heart disease in men", Circulation. 2005; 111, (2005), 157-164.
Mukherjee, P.K., et al., "Docosanoids are multifunctional regulators of neural cell integrity and fate: significance in aging and disease", Prostaglandins Leukot. Essent. Fatty Acids 77,10.1016/j.plefa.2007.10.022, (2007), 233-238.
Muldoon, MF, et al., "Serum phospholipid docosahexaenonic acid is associated with cognitive functioning during middle adulthood", The Journal of nutrition 140: doi: 10.3945/jn.109.119578, (2010), 848-853.
Narendran, R, et al., "Improved Working Memory but No Effect on Striatal Vesicular Monoamine Transporter Type 2 after Omega-3 Polyunsaturated Fatty Acid Supplementation", PLoS One 7(10):e46832. doi:10.1371/journal.pone.0046832, (2012), 7 pgs.
Nealen, PM, "Three Billion Years of Fatty Acid Metabolism Shape Human Cognitive Performance. Frontiers in Evolutionary Neuroscience", Frontiers in Evolutionary Neuroscience. 2011;3:6. doi:10.3389/fnevo.2011.00006., (2011), 2 pgs.
Novak, E.M., et al., "High dietary omega-6 fatty acids contribute to reduced docosahexaenoic acid in the developing brain and inhibit secondary neurite growth", Brain Res. 1237.10.1016/j.brainres.2008.07.107, (2008), 136-145.
Oken, E, et al., "Decline in fish consumption among pregnant women after a national mercury advisory", Obstet Gynecol. 2003; 102, (2003), 346-351.
Oken, E, et al., "Maternal fish consumption, hair mercury, and infant cognition in a U.S. Cohort", Environ Health Perspect. 2005; 113, (2005), 1376-1380.
Ouellet, M, et al., "Diffusion of docosahexaenoic and eicosapentaenoic acids through the blood-brain barrier: an in situ cerebral perfusion study", Neurochem. Int. 55, (2009), 475-482.
Perez, MA, et al., "Long-term Omega-3 fatty acid supplementation induces anti-stress effects and improves learning in rats", Behav Brain Funct. Jun. 14, 2013;9(1):25, (2013), 12 pgs.
Pifferi, F., et al., "N-3 fatty acids modulate brain glucose transport in endothelial cells of the blood-brain barrier", Prostaglandins Leukot. Essent. Fatty Acids 77,10.1016/j.plefa.2007.10.01, (2007), 279-286.

(56) References Cited

OTHER PUBLICATIONS

Pottala, JV, et al., "Higher RBC EPA + DHA corresponds with larger total brain and hippocampal volumes: WHIMS-MRI Study", Neurology. Jan. 22, 2014, (2014), 435-442.

Raji, CA, et al., "Regular fish consumption and age-related brain gray matter loss", Am J. of Prev Med.2014; 47(4), (2014), 444-451.

Rapaport, S.I., "In vivo approaches to quantifying and imaging brain arachidonic and docosahexaenoic acid metabolism", J. Pediatr. 143, (2003), S26-S34.

Sakamoto, T., et al., "Oral supplementation with docosahexaenoic acid and uridine-5'-monophosphate increases dendritic spine density in adult gerbil hippocampus", . Brain Res. 1182, 10.1016/j.brainres.2007.08.089, (2007), 50-59.

Salem Jr, N, et al., "Alterations in brain function after loss of docosahexaenoate due to dietary restriction of n-3 fatty acids", J. Mol. Neurosci. 16, (2001), 299-307.

Salvig, J.D., et al., "Evidence regarding an effect of marine n-3 fatty acids on preterm birth: a systematic review and meta-analysis", . Acta Obstet. Gynecol. Scand. 90,10.1111/j.1600-0412.2011.01171. x, (2011), 825-838.

Schmitz, G., et al., "The opposing effects of n-3 and n-6 fatty acids.", Lipid Res. 47,10.1016/j.plipres.2007.12.004, (2008), 147-155.

Shirai, N., et al., "Effect of dietary docosahexaenoic acid and catechins on maze behavior in mice", Ann. Nutr. Metab. 48,10. 1159/000075305, (2004), 51-58.

Simopoulos, AP, et al., "The importance of the omega-6/Omega-3 fatty acid ratio in cardiovascular disease and other chronic diseases", Exp Biol Med 233. doi: 10.3181/0711-MR-311. pmid:18408140, (2008), 674-678.

Stough, C., et al., "The effects of 90-day supplementation with the Omega-3 essential fatty acid docosahexaenoic acid (DHA) on cognitive function and visual acuity in a healthy aging population", Neurobiology of aging 33: 824, (2012), e821-e823.

Svennerholm, L, "Distribution and fatty acid composition of phosphoglycerides in normal human brain", J. Lipid Res. 9, (1968), 570-579.

Takeuchi, T., et al., "Influence of a dietary n-3 fatty acid deficiency on the cerebral catecholamine contents, EEG and learning ability in rat", Behav. Brain Res. 131,10.1016/S0166-4328(01)00392-8, (2002), 193-203.

Tandy, S, et al., "Dietary krill oil supplementation reduces hepatic steatosis, glycemia, and hypercholesterolemia in high-fat-fed mice", J Agric Food Chem. Oct. 14, 2009;57(19), (2009), 9339-9345.

Turner, N, et al., "Docosahexaenoic acid (DHA) content of membranes determines molecular activity of the sodium pump: implications for disease states and metabolism", . Naturwissenschaften 90, (2003), 521-523.

Vaisman, N, et al., "Correlation between changes in blood fatty acid composition and visual sustained attention performance in children with inattention: effect of dietary n-3 fatty acids containing phospholipids", Am J Clin Nutr. 2008;87, (2008), 1170-1180.

Van De Rest, O, et al., "Effect of fish oil on cognitive performance in older subjects: a randomized, controlled trial", Neurology 71: doi:10.1212/01.wnl.0000324268.45138.86, (2008), 430-438.

Willett, WC, "The role of dietary n-6 fatty acids in the prevention of cardiovascular disease", J Cardiovasc Med. (Hagerstown). 2007; 8 Suppl 1, (2007), S42-S45.

Wong, AT, et al., "Supplementation with n3 fatty acid ethyl esters increases large and small artery elasticity in obese adults on a weight loss diet", J Nutr. Apr. 2013;143(4), (2013), 437-441.

Wu, A., et al., "Docosahexaenoic acid dietary supplementation enhances the effects of exercise on synaptic plasticity and cognition", Neuroscience 155,10.1016/j.neuroscience.2008.05.061, (2008), 751-759.

Wu, JH, et al., "Association of plasma phospholipid long-chain Omega-3 fatty acids with incident atrial fibrillation in older adults: the cardiovascular health study", Circulation. Mar. 6, 2012;125(9), (2012), 1084-1093.

Wurtman, R.J., et al., "Synapse formation is enhanced by oral administration of uridine and DHA, the circulating precursors of brain phosphatides", J. Nutr. Health Aging 13,10.1007/s12603-009-0056-3, (2009), 189-197.

Yokoyama, M, et al., "Effects of eicosapentaenoic acid on major coronary events in hypercholesterolaemic patients (JELIS): a randomised open-label, blinded endpoint analysis", . Lancet. 2007; 369, (2007), 1090-1098.

Yoshida, S., et al., "Synaptic vesicle ultrastructural changes in the rat hippocampus induced by a combination of a-linolenate deficiency and a learning task", J. Neurochem. 68,10.1046/j.1471-4159. 1997.68031261.x, (1997), 1261-1268.

"U.S. Appl. No. 15/836,047, Non Final Office Action dated Apr. 17, 2018", 12 pgs.

\* cited by examiner

OMEGA-3 SPRAY

This application claims the benefit of priority to PCT Application Serial No. PCT/US2016/037683 also entitled "Omega-3 Spray," filed Jun. 15, 2016, which claims the benefit of priority of the U.S. Provisional Patent Application Ser. No. 62/175,934 entitled "Omega-3 Spray," filed Jun. 15, 2015, the disclosures of which are incorporated herein by reference in their entirety.

RELATED FIELD

Several embodiments relate generally to nutritional supplements.

BACKGROUND

Omega-3 supplements exhibit several health benefits in the human body, including anti-inflammatory benefits. Many of these supplements provide Omega-3 in various forms of oil, including but not limited to fish, krill, algae, flax and chia oil. The "fishy" taste and smell of many of these supplements dissuade people from taking the supplements. Additionally, many of these supplements attempt to address this issue by placing the Omega-3 oil in a gel capsule, which has been known to cause various forms of post-ingestion burps and indigestion.

Challenges to Omega-3 in the form of capsules are based in a general aversion to and distaste for large Omega-3 oil capsules, which are difficult to swallow. In addition, large capsules present a challenge to consumption for infants and adolescents.

The benefits of Omega-3, particularly in fish and algae oil, have been demonstrated in various trials, journal publications and studies.

SUMMARY

Omega-3 fatty acids become highly oxidized when enclosed in a bottle that requires opening on a regular basis. This resulting oxidization reduces or eliminates the anti-inflammatory benefits offered by the Omega-3 supplement—as oxidized Omega-3 has been known to cause an inflammatory response in the human body.

Accordingly, several embodiments advantageously provide a container with a pump for ejecting Omega-3 compound in a mist or liquid form through a nozzle. The nozzle is adapted with a seal to prevent oxygen, outside of the container, from interacting with the Omega-3 oil prior to its ejection through the nozzle. Spraying Omega-3 oil, however, would likely worsen the "fishy" smell and taste that many people find objectionable. Hence, several embodiments include a plant-based Omega-3 compound in liquid form in the disclosed container. For example, the plant-based Omega-3 compound can be derived from algae, the source from which all Omega-3 accumulates in fish in the natural marine ecosystem.

Some embodiments of this disclosure have other aspects, elements, features, and steps in addition to or in place of what is described above. These potential additions and replacements are described throughout the rest of the specification.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
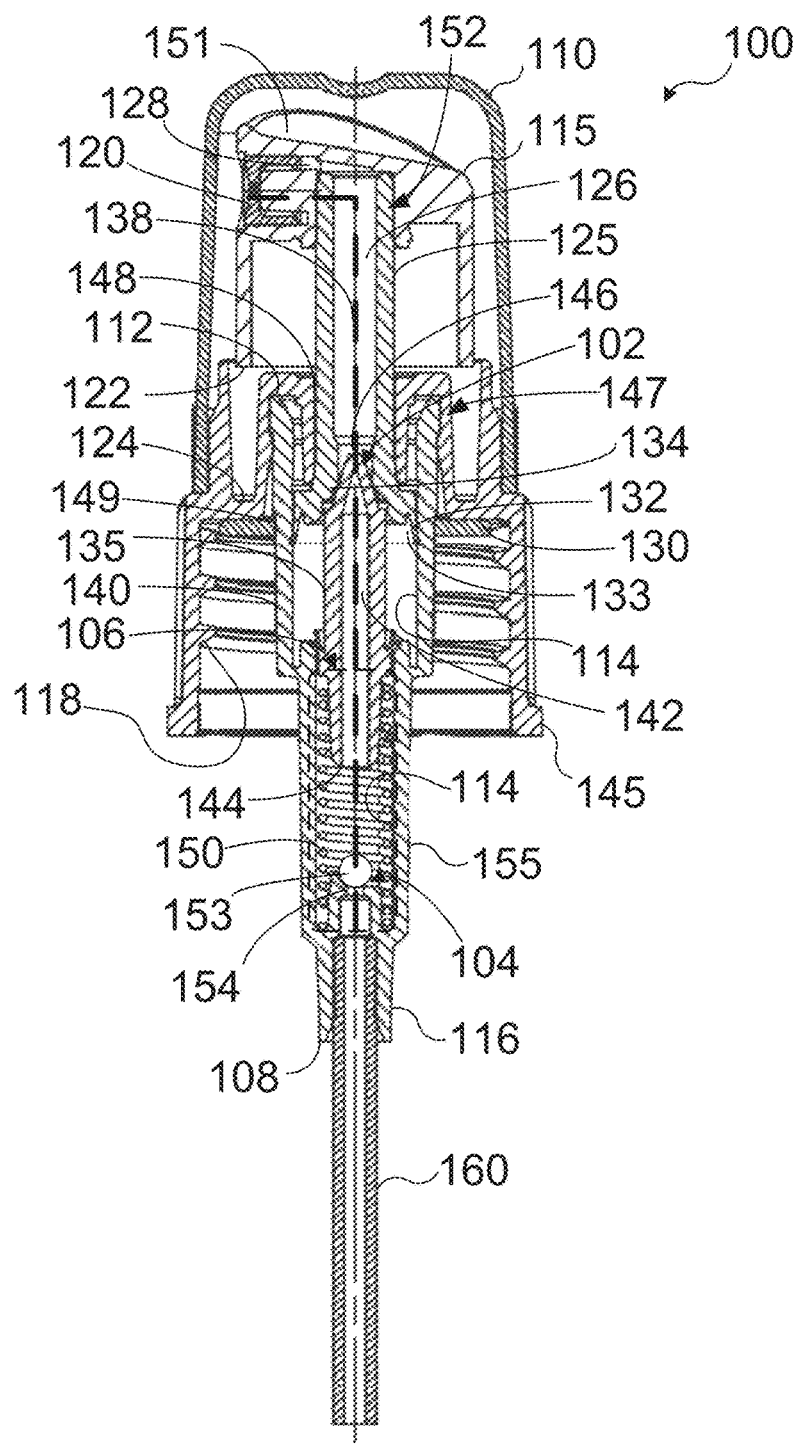
FIG. 1 illustrates an exemplary cross section of a pump assembly cap, according to an embodiment.

Omega-3 oils are integral to the healthy function of every cell in the human body, (see e.g., *The Nutrition Source, Harvard School of Public Health* [71]). Several embodiments involve a spray container and pump, in which the cap is not removed during the course of normal daily use. The spray and pump act as a closed chamber in which the oils exit the chamber through a one-way valve and are only exposed to oxygen during the consumption process. The spray container containing the Omega-3 oil also contains an oxidation seal in the form of a cap. The Omega-3 oil fits within a vegan diet. It is also fermented and sustainably harvested from drinking quality water. The disclosed Omega-3 oil is more potent, more environmentally sustainable compared to fish oil, and more pure (e.g., free of ocean contaminants) when compared to fish oils.

Sources of Omega-3 Fatty Acids

Omega-3 oils are derived from alpha-linolenic acid (ALA), which is converted into eicosapentaenoic acid (EPA) and docosahexaenoic acid (DHA).

ALA is a short chain (18 carbon) omega-3 fatty acid. The human body cannot make its own ALA—it must be obtained through the diet. ALA is found in small amounts in animal flesh, in very small amounts in a most plant products, but in relatively large amounts in soy, walnuts, canola oil, flaxseeds and their oil, hempseed oil, camelina oil, and chia seed oil.

Docosahexaenoic acid (DHA) is an omega-3 fatty acid that functions as a major structural fat in the brain, where it can account for up to 97% of the omega-3 fats, and in the retina, where it can account for up to 93% of the omega-3 fats.

EPA is a long chain (20 carbon) omega-3 fatty acid. It is found mostly in fatty fish, in small amounts in eggs, and in very small amounts in seaweed. Some EPA is converted into series 3 eicosanoids which can reduce blood clotting, inflammation, blood pressure, and cholesterol. The human body can produce limited amounts of DHA out of ALA and out of EPA.

The omega-3 compositions described herein generally contain DHA triglycerides, optionally with some EPA triglycerides. Such compositions are referred to interchangeably as "omega-3" or DHA oils or compositions. These compositions can in some cases contain small amounts of free fatty acids but typically have little or no detectable free fatty acids. For example, the DHA component of the compositions described here can have less than 1%, or less than 0.9%, or less than 0.8%, or less than 0.7%, or less than 0.6%, or less than 0.5%, or less than 0.4% free fatty acids, or less than 0.3%, or less than 0.2%, or less than 0.1% by weight free fatty acids, for example, as detected by AOCS method Ca 5a-40.

The DHA used in the compositions and delivery devices described herein is plant-based, rather than fish oil-based. Although fish oil-based DHA may be used if and as desired, the use of plant-based DHA provides a DHA product that avoids unpalatable fish odor or fish taste. Also, obtaining DHA from plant based sources can provide a product that can be essentially free of, substantially excludes, eliminates, or otherwise reduces the presence of, eicosapentaenoic acid (EPA). EPA may be present in fish oil (and thus in fish oil-based DHA), and which may disrupt the EPA:DHA balance in the developing baby and potentially cause fetal developmental problems in pregnant women. Use of plant-based sources and careful balancing of the ratio of any added EPA can obviate this issue.

In addition, according to leading environmental experts, fishless oceans could be a real possibility in the next 35 years. Demand for fish and fish oil may exceed Earth's supply. Algae is an untapped, bountiful source of omega-3 fatty acids. Unlike fish oil or even krill oil, which is the conventional way of deriving omega-3 supplements, massive batches of algae can be grown in drinking quality water entirely outside of the ocean. This source is a renewable resource free of the toxins, heavy metals, and ocean polluting contaminants, such as PCB's and dioxins. Fish are not born with omega-3 in their systems and do not endogenously create omega-3 in substantial amounts. Fish ingest omega-3 fatty acids through their diet, by eating the same microalgae included in embodiments of this disclosure or by consuming other fish who have previously consumed microalgae. Hence, microalgae and other microorganisms are an excellent, sustainable source of omega-3 fatty acids.

Any microorganisms capable of producing a single-cell edible oil containing DHA can be employed as a source of DHA. For example, photosynthetic diatoms can be used. Examples include marine dinoflagellates. For example, the omega-3 fatty acids used in the compositions and delivery devises described herein can be prepared and/or derived from *Parietochloris* spp., *Rhodomonas* spp., *Cryptomonas* spp., *Parietochloris* spp., *Hemisebnis* spp.; *Porphyridium* spp., *Glossomastix* spp., *Crypthecodinium* sp. (e.g., *Crypthecodinium cohnii* dinoflagellate microalgae), *Thraustochytrium* sp., and/or mixtures thereof.

*Schizochytrium* is a genus of microalgae, a type of thraustochytrid, and a marine microheterotroph. Thraustochytrids are large-celled marine heterokonts and classified as oleaginous microorganisms due to their production of omega-3 oils. Thraustochytrids are amenable to various production strategies that can be used to increase omega-3 oil output. Some types of thraustochytrids produce simpler polyunsaturated fatty acid profiles, which can simplify production of high purity, desirable oil components (e.g., DHA).

*Crypthecodinium cohnii*, an obligate heterotroph requiring a reduced carbon source for growth. *C. cohnii* is contains a fatty acid profile in which DHA is the only polyunsaturated fatty acid (PUFA) present in significant quantities (greater than about 1% of the total amount of PUFAs). Samples of this organism, designated MK8840, have been deposited with the American Type Culture Collection at Rockville, Md., and assigned accession number 40750.

Methods of Manufacturing Omega-3 Fatty Acids

The omega-3 fatty acids can be generated by cultivation or growth of DHA-producing microorganisms. For example, marine microalgae can be cultivated in a simple medium containing glucose and yeast extract. Use of these components in a solution such as fresh water or seawater provides economically significant growth rates and cell densities. For example, during the course of a 3-5 day fermentation, *C. cohnii* cell densities of at least 10 grams of biomass per liter of solution, and typically from 20 to about 40 grams per liter, can be attained.

Cultivation can occur in any suitable fermenter. One example, is in a stirred tank fermenter (STF) or in an air lift fermenter (ALF). When a STF is selected, agitation can be provided using, for example, Rushton-type high efficiency turbines or pitched-blade or marine impellers. Agitation and duration can renew the supply of oxygen to the microorganisms. The rate of agitation can be increased as the biomass increases, to satisfy an increased demand for oxygen. For example, the tip speed at not greater than about 500 cm/sec. Selection of strains of microorganisms which are capable of withstanding greater tip speeds without undergoing shear is within the purview of those of skill in the art. The use of such strains is expressly included in this invention.

As noted, fresh water or seawater are acceptable media for the nutrient solution. The fresh water or seawater can be either natural, filtered or an artificial mix. Seawater can be diluted to ¼ strength with tap water or concentrated to 2 times normal strength. One example is Instant Ocean® (IO) brand artificial seawater. Although microalgae such as *Schizochytrium* and *Crypthecodinium* are marine microorganisms, growth of these microalgae can occur in zero salinity aqueous media. The use of variants that grow well in reduced salinities can be employed.

Micronutrients can be added. However, such micronutrients and generally are present in seawater and most sources of fresh water (e.g., tap water). If the organism selected is heterotrophic, such as the *Schizochytrium* and *Crypthecodinium* microalgae, a carbon source (e.g., glucose or other types of sugars or saccharides) is added.

After addition of the aqueous medium to the fermenter, the fermenter containing the medium can be sterilized and cooled prior to adding the nutrients and a seeding population of microorganism. Although it is acceptable to sterilize the nutrients together with the water, sterilization in this manner can result in a loss of available glucose. The nutrients and microorganism can be added simultaneously or sequentially.

An effective seed concentration can be determined by those of skill in the art. When a STF is used, for example, a population of about 0.05 to 1.0 grams of dry weight equivalent per liter of microorganisms can be added at the beginning of the fermentation. This is about $10^5$ cells per ml. For example, when using a 30 liter fermenter, 1.5 liters of seeding media, containing viable cells at a density of 20 g dry weight per liter can be added.

Oxygen levels can be maintained at an oxygen demand (D.O.) of at least about 10% of air saturation level. Biosynthesis of DHA generally requires oxygen and, accordingly, higher yields of DHA require D.O. levels at from about 10% to 50% of air saturation levels. Agitation tip speeds of 150-200 cm/sec in combination with an aeration rate of 1VVM (volume of air/volume of fermenter per minute) provides D.O. levels of from about 20% to about 30% at biomass densities of about 25 g dry weight/liter of culture. Higher cell densities may require higher D.O. levels, which can be attained by increased aeration rates by $O_2$ sparging, or by increasing the air pressure in the fermenter.

Any acceptable carbon sources can be employed. For example, carbon can be provided to *Schizochytrium* spp. and *Crypthecodinium* spp. in the form of glucose. Other heterotrophs can use other reduced carbon sources, a matter easily determined by those of skill in the art, and autotrophs utilize carbon dioxide. *C. cohnii* will also grow on other reduced, more complex, carbon sources. Typically, a fermentation is initiated with about 10-20 g/liter glucose. More glucose can be added during the fermentation as required. For example, from about 80 to 150 g glucose/liter initially can be added, thereby minimizing the frequency of future additions. If glucose levels drop to zero, the culture can die within a few hours. The amount of carbon source provided to other organisms can readily be determined by those of skill in the art.

In addition to a reduced carbon source, a nitrogen source, such as yeast extract (YE), can be provided to the medium. Commercially available yeast extract is acceptable. For example, DIFCO brand yeast extract can be used. The yeast extract is an organic nitrogen source also containing micronutrients. Other organic nitrogen sources can easily be determined by those of skill in the art. However, such compounds are more expensive than yeast extract. The use of variants capable of growing on urea or nitrates is within the scope of this invention. For example, the fermentation can be initiated with about 4-8 g yeast extract/liter. More yeast extract can be added during fermentation. A typical fermentation run can utilize from about 25 to 50 g.

The cultivation can be carried out at any life-sustaining temperature. Generally, *Schizochytrium* spp. and *Cryptheco-dinium* spp. will grow at temperatures ranging from about 15° C. to 34° C. For example, the temperature is maintained at about 20°–28° C. Strains which grow at higher temperatures can be employed, for example, because they will have a faster doubling time, thereby reducing the fermentation time. Appropriate temperature ranges for other microorganisms are readily determined by those of skill in the art.

The cultivation can be carried out over a broad pH range, typically from about pH 5.0 to 9.0. Preferably, a pH range of from about 7.0 to about 7.8 is used. The initial growth tends to acidify the medium. Addition of a base, such as KOH or NaOH, can be employed to control such acidification. During the later stages of the fermentation, the culture medium tends to become alkaline. The addition of yeast extract ordinarily is sufficient to maintain the pH in the desired range. However, if desired, inorganic acid pH controls can be used to correct alkalinity.

Production of the single cell oil is induced in microalgae by the imposition of a nitrogen deficiency. Such deficiencies can be caused by providing yeast extract in a limiting amount such that the medium runs out of yeast extract while available glucose remains. The present invention recognizes that it is the carbon source to nitrogen source ratio which promotes the efficient production of the single cell oil. Using glucose and yeast extract as exemplary, a preferred ratio of carbon source to nitrogen source is about 2-4 parts glucose to 1 part yeast extract. Similar ratios for other carbon and nitrogen sources can be calculated by those of skill in the art.

After induction of oil production, the culture is grown for about 24 additional hours. During this period of synthesis, a single cell oil containing DHA is being synthesized and visible oil droplets can become apparent. Those of skill in the art can readily calculate the time of fermentation required to achieve the expected amount of cell biomass based upon the added amount of yeast extract. When that time has passed, the culture can be grown for an additional 24 hours and harvested. In general microorganisms such as *Schizochytrium* spp. and/or *Crypthecodinium* spp. can be cultivated for a time sufficient to produce single cell oil, usually from about 60 to about 90 hours, although this time is subject to variation.

When using wild-type *Schizochytrium* spp. and *Crypthecodinium* spp., about 20% to 30% of the resultant biomass can be extractable oil. Strain selection can increase this percentage and such selection is within the ken of those with ordinary skill in the art. Such oil can include greater than about 90% triglycerides. In some cases, the oils produced by such methods can have the following fatty acid composition.

15-20% myristic acid ($C_{14}$:0);
20-25% palmitic acid ($C_{16}$:0);
10-15% oleic acid ($C_{18}$:1);
40-45% DHA ($C_{22}$:6); and
0-5% others.

The crude oil can have a yellow-orange color and can be liquid at room temperature. The oil can contain at least about 20% DHA by weight, or 25% DHA by weight, or 30% DHA by weight, or at least about 35% DHA by weight.

The organisms can be harvested by processes available in the art, such as the centrifugation, flocculation or filtration. The organisms can be processed immediately or dried for future processing. In either event, the oil can be extracted with an effective amount of solvent. Suitable solvents can include water to remove, non-oil components. Other solvents that can be employed include chloroform, ethanol, methanol, ethyl acetate, isopropyl alcohol, diethyl ether, dioxan, isopropyl ether, dichloromethane, tetrahydrofuran, and combinations thereof.

For example, when hexane is employed a suitable ratio of hexane to dry biomass is about 4 liters of hexane per kilogram of dry biomass. The hexane preferably is mixed with the biomass in a stirred reaction vessel at a temperature of about 50° C. for about 2 hours. After mixing, the biomass is filtered and separated from the hexane containing the oil. The residual biomass, i.e. the single cell edible oil extracted biomass of the microorganisms, such as *Schizochytrium* spp. and/or *Crypthecodinium* spp., can be used as an animal feed, containing as it does about 35-40% protein, 8-10% ash and 45-50% carbohydrates. The hexane then is removed from the oil by distillation techniques. Oilseed processing equipment is suitable to perform the filtering, separation and distillation. Additional processing steps, available in the art, can be performed if required or desirable for a particular application. These steps can involve processes similar to those employed for vegetable oil processing.

For example, in some cases the extracted oils can further include an absorption process to remove one or more undesirable compounds, for example, color bodies and/or phosphatides that may be present. For example, the absorption process can include absorption of impurities with a neutral earth (also termed natural clay or fuller's earth), acid-activated earth, activated carbon, activated clays, silicates, and or a combination thereof) and a filter aid.

Compositions

A composition produced by such processes can include at least about 30% DHA by weight, or 40% DHA by weight, or 50% DHA by weight, or 60% DHA by weight, or 70% DHA by weight, or 80% DHA by weight, or 90% DHA by weight, or at least about 95% DHA by weight. In some embodiments, the omega-3 composition comprises at least about 15% DHA of the total fatty acid content of the composition, illustratively, about 5 to about 70% DHA, about 10 to about 80%, and about 20 to about 60% of the total fatty acid content of the lipid composition, wherein the DHA is produced by the microalgae. In other embodiments, the total DHA amount of the lipid composition is about 60% to about 95% of the total fatty acid content of the lipid composition.

In some embodiments, the omega-3 composition does not contain ALA. In other embodiments, the omega-3 composition contains some ALA. For example, the omega-3 compositions can contain at least about 2% ALA, at least about 5% ALA, at least about 7% ALA, at least about 10% ALA, at least about 15% ALA of the total fatty acid content of the lipid composition. In some cases, the omega-3 compositions can contain less than about 25% ALA, less than about 20% ALA, less than about 15% ALA, less than about 10% ALA, less than about 5% ALA, less than about 3% ALA, less than about 1% ALA of the total fatty acid content of the lipid composition. The ALA can also be produced by or obtained from microalgae.

The omega-3 compositions can contain no detectable amounts of EPA. In other embodiments, the omega-3 compositions can contain EPA. For example, the omega-3 compositions can contain from 2% to 30% EPA. In some cases, the omega-3 compositions can contain at least 2% EPA, at least 3% EPA, at least 4% EPA, at least 5% EPA, at least 6%, at least 7%, at least 8%, at least 9%, at least 10%, at least 11%, at least 12%, at least 15%, at least 20%, at least 25%, or at least 30% EPA of the total fatty acids.

In some cases, up to one-third of the omega-3 oil in the compositions can be EPA, so that the ratio of DHA:EPA is 2:1. In other cases, the ratio of DHA:EPA can be 4:1. One reason why plant-based sources of DHA are desirable is that fish oil typically has much more EPA than DHA. Hence, obtaining an omega-3 oil composition with more DHA than EPA is simpler and less expensive when plant-based sources are employed.

The omega-3 compositions can contain ingredients other than DHA triglycerides, EPA triglycerides, phospholipids, or ethyl esters. Examples include vitamins, rosemary oil, turmeric, astaxanthin (a keto-carotenoid), medium chain fatty acids (e.g., in triglyceride form), vegetable oil, antioxidants, and mixtures thereof. Vitamins such as vitamin A, vitamin C, vitamin D, and mixtures thereof. Medium-chain triglycerides (MCTs) are triglycerides whose fatty acids have an aliphatic tail of 6-12 carbon atoms. Such MCTs can be obtained from palm or coconut oil.

Optionally, synthetic and/or natural antioxidants can be included in the compositions including, but not limited to, butylated hydroxytoluene (BHT), butylated hydroxyanisole (BHA), tert-butylhydroquinone (TBHQ), ethoxyquin, beta-carotene, vitamin E, and vitamin C also can be added to the harvested cells.

The amount and/or type of such components and/or antioxidant(s) provided can depend on the desired product formulation, packaging method, and/or the desired shelf life.

The omega-3 compositions can be administered to or consumed by a subject in a daily dosage regimen. For an adult subject this may be, for example, an oral dose of DHA between 0.01 gram and 5 grams. In further embodiments, an oral dose of DHA can be between 0.05 gram and 3 grams. In still further embodiments, an oral dose of DHA can be between 0.1 grams and 1 grams. In other embodiments, an oral dose of DHA can be between 0.1 g and 0.7 grams. In additional embodiments, an oral dose of DHA can be between 0.2 grams and 0.5 grams. In yet additional embodiments, an oral dose of DHA can be between 0.25 grams and 0.5 grams. In addition, some embodiments can optionally include an oral dose of EPA between about 0.01 g and about 0.3 g. For example, when EPA is present in the compositions, the amount of DHA can be about 350 mg and the amount of EPA can be about 120 mg. In another example, the compositions contain no detectable amount of EPA, and about 50 mg to 700 mg DHA.

Benefits of Omega-3 Fatty Acids

"The study found that children's blood levels of the long-chain Omega-3 DHA (the form found in most abundance in the brain) 'significantly predicted' how well they were able to concentrate and learn."[74]

"Women who had the highest levels of omega-3 fatty acids in their blood had the largest average brain volumes at the end of the study. They also had a 2.7 percent larger volume hippocampus, which is the area of the brain associated with memory."[75]

"What makes omega-3 fats special? They are an integral part of cell membranes throughout the body and affect the function of the cell receptors in these membranes. They provide the starting point for making hormones that regulate blood clotting, contraction and relaxation of artery walls,[90-92,94,96] and inflammation. [62,63] They also bind to receptors in cells that regulate genetic function. [64,65,97] Likely due to these effects, omega-3 fats have been shown to help prevent heart disease and stroke, may help control lupus, eczema, and rheumatoid arthritis, and may play protective roles in cancer and other conditions. [66-70,79,83,84,93,95],"[71]

"Because the first neurons evolved in an environment high in the n-3 (omega-3) fatty acid docosahexaenoic acid (DHA), this fatty acid became a major component of neural structure and function and makes up 10% of the dry weight of the human brain. [86],"[7]

"Two interesting observations are reported in this study. The first is that in this group of young adults superior working memory performance in the 3-back condition prior to supplementation was correlated with higher RBC DHA. This finding is consistent with a previous report in which higher serum DHA was related to superior performance on tests of non-verbal reasoning and working memory in a relatively large cohort of middle aged adults. [1] Second, there was an improvement in working memory performance in the 3-back condition after six months of n-3 PUFA supplementation. Although, practice-effects cannot be ruled out as the reason for this observation in this cohort, this result is consistent with some clinical trials suggesting that n-3 PUFA (fish oil) supplementation improves cognitive functioning in elderly adults with mild to no cognitive impairment. [2-5,76],"[6]

"The n-3 (also called omega-3) long-chain fatty acid docosahexaenoic acid (DHA, 22:6n-3), with a 22-carbon chain and six double bonds, comprises about 10% of the dry weight of the human brain. [8,9] Animal studies have shown that DHA readily crosses the blood/brain barrier [10] and plays a critical positive role in all aspects of neuronal growth, synaptic connections, and functioning. [11-14] This includes roles in regulating the activity of Na+K+ATPase in the neural membrane, [15-17,87] neuron size, [18] neurogenesis, [19-25] neurite growth, [22,26-29] synapse formation and function, [29-33] neuronal integrity and vitality, [34-36] gene expression in the brain, [37] brain glucose transport, [38] cognitive development, [39-41] and learning ability. [13,15,25,30,42-51],"[7]

"It is well understood that n-3 fatty acids are profoundly bio-active in neural as well as other tissues, with influence on cell membrane fluidity, [53,54] oxidative capacity, [55] and gene expression. [56] Their direct effects on the genesis, viability, and connectivity of neural tissues have also been demonstrated repeatedly in animal studies, [7] and their dietary importance to the neural development of human infants is also known. [57-60],"[52] "EPA and DHA give rise to anti-inflammatory and inflammation resolving mediators called resolvins, protectins and maresins. Mechanisms underlying the anti-inflammatory actions of marine n-3 fatty acids include altered cell membrane phospholipid fatty acid composition, disruption of lipid rafts, inhibition of activation of the pro-inflammatory transcription factor nuclear factor kappa B so reducing expression of inflammatory genes, activation of the anti-inflammatory transcription factor peroxisome proliferator activated receptor γ and binding to the G protein coupled receptor GPR120."[61]

"From the third trimester until the second year of life, a developing child needs a steady supply of DHA to form the brain and other parts of the nervous system. [7] Many women shy away from eating fish because of concerns that mercury and other possible contaminants might harm their babies,[70] yet the evidence for harm from lack of omega-3 fats is far more consistent, and a balance of benefit vs. risk is easily obtained."[71]

Oxidation of Omega-3 Fatty Acids

Fat oxidation is a normal process that occurs when fats or oils are exposed to air (oxygen), sunlight, or elevated temperature. These factors cause chemical reactions in the fats, which include breaking fatty acids from glycerin or the addition of oxygen to unsaturated fatty acids. The formation of peroxide products results. The more oxygen (air), heat, or sunlight that is present, the greater the rate of peroxide formation. The type, form, and amount of fat (oils) can also influence the rate of oxidation. The process of peroxide formation in foods can be controlled by adding antioxidants that react with free radicals and slow down auto-oxidation or the natural formation of peroxides.

While omega-3 fatty acids have useful benefits for the human body, in certain states of oxidation, it can be toxic to the human body. For example, oxidized omega-3 can have anti-inflammatory effects. The benefits and efficacy of omega-3 fatty acids, however, are reduced due to oxidation.

Evidence indicates that dietary oxidized fats can contribute to the development of atherosclerosis and thrombosis. Studies attribute the presence of adverse effects to the consumption of stale fats, because oxidized fats contain highly reactive and toxic substances that can modify proteins, nucleic acids and other biomolecules in vivo. The methylene groups positioned between cis double bonds present in polyunsaturated fatty acids are highly reactive to oxidizing compounds, favoring organic free-radical formation and oxidized by-products with significant pro-oxidant potential among biological compartments.

The adverse effects of oxidized fat are, for example, described in Garcia-Hernandez, "Effect of Omega-3 dietary supplements with different oxidation levels in the lipidic profile of women: a randomized controlled trial," Int'l. J. Food Sci. Nutr., December 2013 and in Elena Garcia, Universidad Miguel Hernandez de Elche, "Oxidized Omega-3 Supplements with Different Oxidation," September, 2014.

For example, peroxidation of highly unsaturated fatty acids can generate products such as 4-hydroxy-2-hexenal (4-HHE), 4-hydroxy-2-nonenal (4-HNE), and a wide variety of iso-prostanes, the presence of which are often measured as signs of oxidative stress in clinical trials. In some cases, oxidation of docosahexaenoic acid (DHA, 22:6 n-3) can lead to the formation of F2-isoprostane-like compounds which were named F4-neuroprostanes (NeuroP) (Roberts L J et al., J Biol Chem 1998, 273, 13605). The concentration of such compounds in the human cerebrospinal fluid can be elevated in patients with Alzheimer's disease compared to matched controls. The compositions and delivery devises described herein have reduced amounts of oxidized fatty acids and avoid oxidation of the components in the omega-3 compositions.

Oxidation generates a sequence of breakdown products, starting with primary oxidation products (peroxides, dienes, free fatty acids), then secondary products (carbonyls, aldehydes, trienes), and then tertiary products.

Peroxides can be measured to ascertain the amount of primary oxidation products are present in the omega-3 oils by a variety of procedures. The oxidation of omega-3 fatty acids can form hydroperoxides and hydroperoxy alkenals that can be detected by a variety of processes, for example, by mass spectrometry or gas chromatography. One standard method for detecting peroxide products of lipid oxidation is Association of Analytical Chemists (AOAC) method 965.33, which involves dissolving the oil sample in a solvent and potassium iodide, then titration with sodium thiosulfate while using starch as an indicator.

A p-Anisidine Value identifies the amount of aldehydes (principally 2-alkenals and 2,4-dienals) in oils by reaction of these compounds with the p-Anisidine, to provide a measure of the secondary oxidation of oils.

A TOTOX value can be used as a measure of primary and secondary oxidation and total oxidation, which is calculated from peroxide and anisidine measurements using the following formula for TOTOX=(2×peroxide value)+anisidine value.

Although the regulatory authorities of most countries have not established standards for omega-3 products, voluntary standards for manufacturers have been proposed by international organizations. For example, a peroxide value of less than or equal of 5 milliequivalents, a p-anisidine value of less than or equal to 20, and/or a TOTOX value less than or equal to 26, are voluntary standards that have been proposed.

For example, when the amount of peroxide in omega-3 compositions is measured as milliequivalents per kilogram (meq/Kg), the DHA compositions described herein can have less than 5 meq/Kg, or less than 4 meq/Kg, or less than 3 meq/Kg, or less than 2 meq/Kg, or less than 1 meq/Kg, or less than 0.7 meq/Kg, or less than 0.5 meq/Kg, or less than 0.4 meq/Kg, or less than 0.3 meq/Kg, or less than 0.2 meq/Kg, or less than 0.1 meq/Kg, or less than 0.05 meq/Kg, or less than 0.01 meq/Kg.

When measuring p-Anisidine Values, the DHA compositions described herein can be less than 20, or less than 18, or less than 15, or less than 12, or less than 10, or less than 9, or less than 8, or less than 7, or less than 6, or less than 5.

For example, the amount of peroxides in DHA products manufactured as illustrated in the Examples was less than 0.1 meq/Kg. Similarly, tests indicate that when such a DHA product is sprayed from the spray container described herein, the peroxide value was about 2 meq/Kg, and the p-anisidine value was 6.81.

Although the amount of peroxides in the DHA compositions can vary somewhat, the DHA product therefore has only low amounts of peroxides with peroxide values in the less than 5 meq/Kg to less than 0.01 meq/Kg range both when dispensed into the spray container, and when sprayed (administered) to an individual.

A recent article by Jackowski et al. (*Journal of Nutritional Science* 4: 1-10 (July 2015)) describes an evaluation of primary and secondary oxidation in n-3 fish oils available over the counter in retail stores in Canada. A total of 171 supplements from forty-nine brands were assessed, with 50% exceeding voluntary limits (5 meq/Kg) for at least one measure of oxidation (peroxides), and 39% exceeding the international voluntary safety recommendations for total oxidation (TOTOX) value. These findings are not unique to Canada. In the USA, 27% of products tested were found to have more than twice the recommended levels of lipid peroxides (Harris, Curr Cardiol Rep 12, 503-508 (2010)), while in South Africa (Khorsan et al. Mil Med 179, 11 Suppl., 2-60 (2014)) and New Zealand (Janssen & Kiliaan, Prog Lipid Res 53, 1-17 (2014)) more than 80% of supplements tested exceeded recommended levels.

Omega-3 Oral Spray

Several embodiments include an Omega-3 oral spray that is able to remedy previously unresolved challenges associated with Omega-3 supplements. Particularly, the disclosed Omega-3 oral spray is an eco-friendly, non-toxic, easy to ingest, oxidation free, and flavorful supplement.

Many Omega-3 supplements contain fish, krill or other marine or land plant-based oil sources. These supplements place the Omega-3 oil in soft gel capsules. This is done to protect people against the foul "seafood" smell associated with marine-based Omega-3 oils and to attempt to make ingestion of the supplement easier. Because fish obtain Omega-3 in their bodies from dietary algae, a larger quantity of fish oil is necessary to deliver comparable amounts of the Omega-3 fatty acid DHA when compared to algae oil. As a result, the soft gel capsules are often large in size and difficult, often unpalatable to swallow for adults. The problem is exacerbated for children with smaller esophageal tubes and a lesser developed swallowing reflex when compared to adults. The only current remedy to this problem is to remove the soft gels and bottle Omega-3 oils with a screw cap, to be opened upon desired use, and mixed with a sweetener or swallowed directly. This delivery mechanism exposes the Omega-3 oils to environmental oxygen each time the cap is opened, making the Omega-3 oils susceptible to rancidity, spoilage, and toxic levels of oxidation during the course of normal usage of the product after the consumer has purchased the product.

Several embodiments advantageously resolve this problem by using a spray container with an air seal. The amount of oxygen placed in the spray container can be minimized while further oxidation is protected by the air seal. Ordinarily, supplements manufacturers are dissuaded from using a spray container for Omega-3 supplements, because even if the spray container is able to resolve the problems associated with the soft gel capsules, raw fish, krill or algae oil can easily overwhelm the senses of a human being due to its increased potency in unflavored, in mist form. The formula also enables combination with flavors that are not disagreeable with most human beings. The mist produced from the spray containers has no 'fishy' taste or aftertaste and is not hard to swallow. For example, pineapple citrus flavor can be combined with the omega-3 oils. The omega-3 can further contain vitamin D to benefit whoever takes the supplement using the disclosed spray.

Spray Container

The omega-3 oil in liquid form (e.g., a compound or omega-3 compound) can be stored in a container, for instance, a spray container for dispensing the compound while limiting exposure of the compound to oxygen. The spray container can include, for example, a pump assembly cap, a container, and optionally a liner. The pump assembly cap can include a closure for fastening and sealing the pump assembly cap to the container or optionally the liner.

The pump assembly cap can include an actuator (e.g., a trigger lever), that activates a pump assembly cap for dispensing the compound. In an example, the pump assembly cap includes an accumulator reservoir, a one-way outlet valve, a one-way inlet valve, and the actuator. The accumulator reservoir can be attached to a dip tube that draws the compound (e.g., omega-3 fatty acids) from the container. In an example, the pump assembly cap includes a spring located within the accumulator reservoir for biasing the actuator toward a ready position. Where the actuator is pushed down (e.g., toward a dispensing position), the actuator is pushed into the accumulator reservoir (e.g., cylinder). Accordingly, the actuator compresses the spring, and when the actuator is released, the actuator is biased (e.g., pushed back) out of the accumulator reservoir toward the ready position. For instance, the compound is drawn into the accumulator reservoir through the one-way inlet vent by a negative pressure within the accumulator reservoir generated by the actuator moving from the dispensing position to the ready position.

The one-way outlet valve (between the pump and the nozzle) pulls (or pushes) against the dispensing passage (barrel) so air is prevented from flowing into the accumulator reservoir through the nozzle. In other words, the compound within the accumulator reservoir and the container are hermetically sealed from the atmosphere by the one-way outlet valve.

Moving the actuator from the ready position toward the dispensing position (e.g., down-stroke of the piston) dispenses the compound (omega-3 fatty acids) out of the accumulator reservoir. The pump pressurizes the liquid compound within the accumulator reservoir and transports the compound along a dispensing passage (e.g., barrel) and out of the actuator through a nozzle (e.g., orifice). For example, the compound is pressurized as the actuator moves toward a dispensing position and a volume within the accumulator reservoir decreases accordingly. For instance, the one-way inlet valve seals the compound within the accumulator reservoir (e.g., is not pressurized back into the container). The compound moves through the pump assembly cap along a path in one direction through the one-way inlet valve. The one-way outlet valve can be opened to dispensing the compound. In an example, a delivery path extends from the one-way inlet valve, along the inner bore and the one-way outlet valve, and through the orifice. Accordingly, the pump pushes (dispenses) the compound from the accumulation reservoir (e.g., chamber) and through the nozzle as a 'mist.' In other words, the pump assembly cap can atomize the compound as the compound is dispensed.

Figure 2:
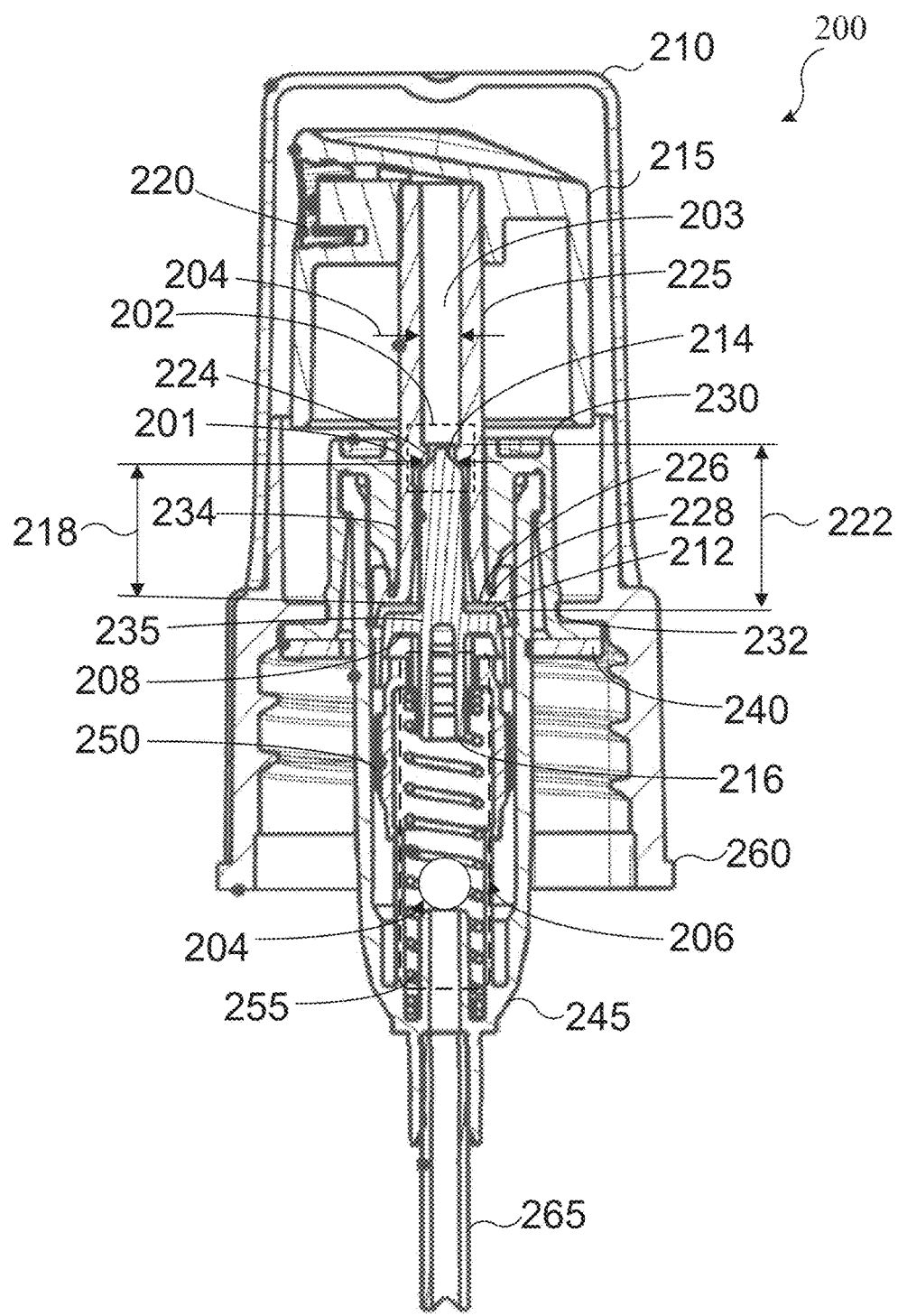
FIG. 2 illustrates a further example of a cross section of a pump assembly cap, according to an embodiment.

For example, the spray container can include a pump assembly cap such as any of those shown in FIG. 1 or 2.

FIG. 1 illustrates a cross section of one example of a pump assembly cap 100. The pump assembly cap 100 includes a housing 155, an actuator 115, a one-way outlet valve 102, a one-way inlet valve 104 and a closure 145. The housing 155 is configured to hold a compound, for instance, an omega-3 compound in liquid form while isolating the compound from interaction with the atmosphere. In an example, the pump assembly cap 100 is illustrated in FIG. 1, with a hood 110 to protect the actuator 115 (pump operator) and the dispensing orifice 120 (spray orifice) from which the omega-3 fatty acids are sprayed.

The housing 155 includes a first end 108 and a second end 112. The housing 155 includes an inner bore 114 extended from the first end 108 to the second end 112. The inner bore 114 includes an accumulator reservoir 106. The accumulator reservoir 106 is configured for fluid communication with a container through the one-way inlet valve 104 coupled with the accumulator reservoir 106. Further, the accumulator reservoir 106 in combination with the valves 102, 104 as described herein isolates the compound (e.g., an omega-3 compound) in a container and in at least the accumulator reservoir 106 of the pump assembly cap 100 from interaction with atmosphere.

In an example, the first end 108 is fluidly coupled to a dip tube 160 by the one-way inlet valve 104. For instance, in the example of FIG. 1, the housing includes a sleeve 116 configured to receive the dip tube 160. In an example, the dip tube 160 is press-fit into the sleeve. In further examples, the attachment of the dip tube 160 to the first end 108 includes, but is not limited to adhesive, threading, snap-fitting, ultrasonic welding or the like. The dip tube 160 includes an elongate conduit for communicating the compound from the container (e.g., a bottom of the container or liner) to the accumulator reservoir 106.

As shown in the example of FIG. 1, the second end 112 includes a coupling for attaching to a closure 145. In an example, the closure 145 fastens the plug assembly cap 100 to a container or liner. For instance, the closure 145 includes a first sealing interface. In the example of FIG. 1, the first sealing interface includes a threaded socket 118 located on a lower side of the closure 145. The threaded socket 118 fastens to a threaded boss of the container. In a further example, the first seal interface includes, but is not limited to, a bayonet style coupling, snap-fit, press-fit, ultrasonic weld, or the like. The closure 145 is constructed from a material including, but not limited to, polypropylene, polyethylene, polystyrene, other polymer, metal, or the like. As shown in FIG. 1, a gasket 130 is optionally located within the threaded socket 118. The gasket is configured for interposing between an upper surface of the threaded boss and a lower surface of the threaded socket 118. The gasket 130 is constructed from a material including, but not limited to, an elastomer, poly butyl rubber, polyethylene, neoprene, ethylene vinyl acetate (EVA), or the like. Accordingly, with the pump assembly cap 100 fastened to the container, the gasket 130 provides a hermetic seal between the closure 145 and the container. The closure 145 includes a second interface 147 for coupling or sealing the closure 145 to the housing 155 (including the accumulator reservoir 106 therein). The second interface 147 includes an aperture 148 extended through the closure 145 and configured for slidable reception of the actuator 115. The gasket 130 includes a concentrically aligned aperture 149 with the aperture 148 of the closure 145.

The actuator 115 includes a user interface 151 and a piston 152 portion. For example, the piston portion 152 includes the piston 125 as shown in FIG. 1. In an example, the piston 125 is integral with the actuator 115. The actuator 115 is movable within the inner bore 114 between the ready position and the dispensing position. In the ready position, a lower portion 122 of the actuator 115 is located at a first distance from an actuator stop 124 located on the closure 145. The accumulator reservoir 106 includes a first volume where the actuator 115 is located at the ready position. In the dispensing position, the lower portion 122 is located at a second distance from the actuator stop 124 less than the first distance. The accumulator reservoir 106 includes a second (smaller) volume where the actuator 115 is located or transitioning toward the dispensing position. The second volume is less than the first volume.

The actuator 115 (including the piston 125) includes a dispensing passage 126 configured for fluid communication with the accumulator reservoir 106 through the one-way outlet valve 102. The dispensing passage 126 extends from the one-way outlet valve 102 to a dispensing orifice 128. For instance, the one-way outlet valve 102 isolates the accumulator reservoir 106 from the dispensing passage 126 where the one-way outlet valve 102 is in the sealed configuration. The actuator 115 (or the piston 125) includes a sealing surface 132 for sealing against the inner bore 114 of the housing 155. For instance, the sealing surface 132 includes a flange 133 having a larger outer dimension that a dimension of the inner bore 114. The flange 133 is compressed within the inner bore 114 providing a seal between the inner bore 114 and the actuator 115 (or the piston 125) that is slidable along the inner bore 114. The slidable sealing surface 132 of the flange 133 enhances the isolation of the accumulator reservoir 106 and accordingly isolates a compound therein (such as the omega-3 compound). As further shown in the example of FIG. 1, the dispensing passage 126 includes a tapered surface 134 for engaging with a poppet 135. The tapered surface 134 includes, but is not limited to a chamfer, fillet, or other tapered surface. In an example, the tapered surface 134 engages with the poppet 135 to form a hermetic seal, including a one-way outlet valve 102.

Where the accumulator reservoir 106 is less than full of the compound, moving the actuator 115 between the ready position and the dispensing position fills the accumulator reservoir 106 with the compound. For instance, the actuator 115 is moved toward the dispensing position (e.g., downward toward the first end 108 of the housing 155). When the actuator 115 is in the dispensing position (e.g., closest to the first end 108 of the housing 155), the one-way outlet valve 102, located along a delivery path 138 between the accumulation chamber 106 and the dispensing passage 126, is closed and sealed. A bias element 150 is located within the inner bore 114 of the housing 155. For instance, the bias element 150 is located within the accumulation reservoir 106. In an example, the bias element 150 is located between the first end 108 of the housing and the actuator 115. The bias element 150 biases the actuator 115 upward toward the ready position. The return movement to the ready position fills the accumulator reservoir 106 (e.g., this is a filling configuration). In various examples, the bias element 150 includes, but is not limited to a coil spring, leaf spring, elastomer, or the like. As the actuator 115 moves toward the ready position from the dispensing position, pressure decreases within the accumulation reservoir 106. The volume of the accumulation reservoir 106 increases as the actuator 115 moves upward toward the ready position. The decreased pressure opens the one-way inlet valve 104 and the compound from the container is drawn into the accumulator reservoir 106 through the dip tube 160. The pressure differential between the pressure within the accumulator reservoir 106 and the container opens the one-way inlet valve 104 and fills the compound into the reservoir 106. For instance, in the filling configuration, the accumulator reservoir 106 is filled with the compound (e.g., the omega-3 compounds described herein) through the one-way inlet valve 104 while the one-way inlet valve 104 is in an open configuration. The one-way outlet valve 102 is in the sealed configuration (according to at least the pressure differential) and the compound within the accumulator reservoir 106 is hermetically sealed from atmosphere.

In an example, the piston 125 is moved by the actuator 115 and compresses the spring 150. Movement of the piston 125 upward increases the vole of the accumulation reservoir 106. The decreased pressure opens the one-way inlet valve 104 and the compound from the container is drawn into the accumulator reservoir 106 through the dip tube 160. The pressure differential between the pressure within the accumulator reservoir 106 and the container opens the one-way inlet valve 104 and fills the compound into the reservoir 106.

The one-way inlet valve 104 includes, but is not limited to, a check valve, a ball check valve, a duckbill valve, lip seal, or the like. The one-way inlet valve 104 includes the open configuration and a closed configuration. In the example of FIG. 1, the one-way inlet valve 104 includes a ball valve. The ball valve includes a ball 153 constructed of glass, ceramic, polymer, metal, or the like. Optionally, the ball 153 is seated along a deformable gasket when in the closed configuration to further enhance the seal of the accumulator reservoir 106 and isolate the reservoir from the bottle or liner containing the compound. The ball valve is seated (e.g., sealed) when a pressure differential biases, generated by depression of the piston 125, the ball 153 to seat within a valve aperture 154.

The one-way outlet valve 102 includes an open configuration and a sealed configuration. In the sealed configuration, the one-way outlet valve 102 is hermetically sealed. The one-way outlet valve 102 includes, but is not limited to a check valve, ball check valve, duckbill valve, or other type of one-way valve. In the example of FIG. 1, the one-way valve 102 is a duckbill valve, also referred to as a lip valve. The duckbill valve includes a lumen 142 that is collapsed at one end to form a seal. A pressure differential with the pressure in the lumen 142 greater than a pressure on the opposing side of the seal (e.g., atmospheric pressure) opens the duckbill valve. For instance, when the pressure difference is greater than a threshold opening pressure, such as a specified opening pressure (including atmospheric pressure and optionally a force generated by the elastic modulus of the valve material included in the lips), the one-way outlet valve 102 is moved (deformed, opened or the like) from the sealed configuration to the open configuration. In various examples, the opening pressure differential includes, but is not limited to, two, four, eight atmospheres, or the like. When the pressure on the opposing side of the seal (e.g., on the side opposed to the accumulator reservoir 106) is greater than the pressure within the lumen 142 in communication with the accumulator reservoir 106, the one-way valve 102 such as the duckbill seal is closed. In an example, the one-way outlet valve 102 is hermetically sealed where the pressure within the accumulator reservoir 106 is above atmospheric, but below the specified opening pressure. Accordingly, the accumulator reservoir 106 is reliably hermetically sealed and the compound is correspondingly isolated from the atmosphere.

In an example, the actuator 115 is moved from the ready position toward the dispensing position to discharge a dose of compound from the pump assembly cap 100. Where the actuator 115 is moved toward the dispensing position (e.g., downward from the orientation shown in FIG. 1) the sealing surface 132 moves toward the first end 108 and the volume within the accumulator reservoir 106 correspondingly decreases. The pressure within the accumulator reservoir 106 increases based on the reduction in volume of the accumulation reservoir 106. Accordingly, the one-way outlet valve 102 transitions from the sealed configuration (e.g., hermetically sealed) to the open configuration by the increasing pressure within the accumulator reservoir from a storage pressure to an opening pressure (optionally greater than a specified opening pressure). The increase in pressure corresponds to a decrease in accumulator volume from the first volume to the second volume.

In the example shown in FIG. 1 and as previously described herein the pump assembly cap 100 includes a poppet 135. As shown, the poppet 135 is within the housing 155 (or, e.g., a poppet body 140). The poppet 135 is movably coupled within the inner bore 114. In an example, the poppet 135 includes an inlet end 144 and an outlet end 146 (corresponding in the example to the one-way outlet valve 102). The poppet 135 includes a primed position and a discharging position. In the primed position, the outlet end 146 is located adjacent to the dispensing passage 126, for instance, the outlet end 146 is engaged with the tapered surface 134 and the one-way outlet valve 102 is mechanically biased toward the sealed configuration by the tapered surface. Stated another way, as the outlet end 146 is biased against the tapered surface 134, the one-way outlet valve 102 is pinched closed. For instance, opposing sides (e.g., lips) of the duckbill (or lip) one-way outlet valve 102 are pressed together by a force of the bias element 150 acting the poppet 135. Accordingly, the seal effectiveness is increased to isolate the compound from the atmosphere and reduce spoilage. The poppet 135 is movable from the primed position to the discharging position. In the primed position, the accumulator reservoir 106 includes the first volume. In the discharging position, the accumulator reservoir 106 includes the second volume less than the first volume. For instance, where the actuator 115 is moved from the ready position to the dispensing position, the actuator pushes the poppet 135 from the primed position to the discharging position. The decreasing volume within the accumulator reservoir 106 corresponds to the movement of the actuator from the ready position toward the actuated position and increases the pressure within the accumulator reservoir 106. In an example, the poppet 135 includes a lumen 142 extending from the inlet end 144 to the outlet end 146. In an example, the outlet end 146 includes the one-way outlet valve 102. The increasing pressure within the accumulator reservoir 106 is communicated with the lumen 142 of the poppet 135. Accordingly, where the pressure within the lumen 142 is at least as great as the opening pressure, the one-way outlet valve 102 is opened (e.g., unsealed).

Where the pump assembly cap 100 includes the poppet 135, the bias element is located between the first end 108 of the housing 155 and the inlet end 144 of the poppet 135. The bias element biases the poppet 135 toward the primed position. For instance, the poppet 135 includes a filling configuration as the poppet 135 moves from the discharging position to the primed position (e.g., with the actuator 115). In the filling configuration, a pressure differential is generated within the accumulator reservoir 106 based on the increasing volume of the reservoir between the first end 108 and the inlet end 144. Accordingly, the one-way outlet valve 102 is closed and the one-way inlet valve 104 is opened. The compound is drawn in to the accumulator reservoir 106 by the pressure differential and is hermetically sealed by the one-way outlet valve 102. In an example, the poppet 135 is the one-way outlet valve 102 that opens and closes (e.g., seals) the dispensing orifice 120.

In the example of FIG. 1, the actuator 115 includes a nozzle 120 located at the dispensing orifice 128. The nozzle 120 optionally includes a plurality of interstices, passages or the like for enhanced atomization of the compound dispensed. In an example, the nozzle 120 is interchangeable within the orifice 128.

FIG. 2 illustrates a further example of a cross section of a pump assembly cap 200. The pump assembly cap 200 includes a hood 210 that protects the actuator 215 and the orifice (or, e.g., needle 220). The actuator 215 includes the piston 225. In an example, the features of the piston 225 are optionally included in the actuator 215 to create an actuator 215 having the features of the piston 225. In the example of FIG. 2, the piston 225 includes a bore 203 having a first dimension 204 and a stop feature 224 including a second dimension 201. The second dimension 201 is smaller than the first dimension 204. The stop feature 224 is located at a distance 218 from a lower end 226 of the piston 225.

The poppet 235 includes a first end 214 and a second end 216. The first end 214 is located at a distance 222 from an upper plunger surface 212. The poppet 235 is biased toward the lower end 226 of the piston 225. The first end 214 can include a width greater than the second dimension 201. Either the piston 225 or the poppet 235 can be configured so the distance 218 is smaller than the distance 222. Accordingly, upper plunger surface 212 can be separated from the lower end 226 of the piston 225. A gap 228 can be located between the upper plunger surface 212 and the lower end 226. In an example, the first end 214 optionally includes a tapered shape to form a hermetic seal between the piston 225 and the poppet 235. For instance the first end 214 of the poppet 235 seals against the stop feature 224. In an example, the first end 214 and the stop feature 224 make up the one-way outlet valve 202.

When the actuator 215 is moved from the dispensing position toward the ready position, a pressure within the accumulator reservoir 206 can increase based on the decrease in volume within the accumulator reservoir 206. The pressure within the accumulate reservoir 206 can act on the upper plunger surface 212 to generate a downward force on the poppet 235 toward the one-way inlet valve 204 because the gap 228 provides access for exposure of the pressure to the upper plunger surface 212. A surface area of the lower plunger surface 208 can be configured to be smaller than a surface area of the upper plunger surface 212. Accordingly, where the pressure within the accumulator reservoir 206 is sufficient to overcome a force applied by the bias member 255, and the pressure differential between the upper plunger surface 212 and the lower plunger surface 208 biases the poppet 235 downward, the poppet 235 is biased toward the one-way inlet valve 204. The first end is biased out of contact with the stop feature 224 and the one-way outlet valve 202 is opened. Accordingly, the compound located within the accumulator reservoir 206 is dispensed by a differential pressure between the accumulator pressure and atmospheric pressure. The compound is dispensed through the bore 203 and out of the pump assembly cap 200 through the nozzle 220.

In one example, the closure 260 includes a turret 230. The turret 230 is located within an aperture 232 of the closure 260. For instance, the piston 225 and the poppet 235 are located within a passage 234 within the turret 230. In the filling configuration, the piston 225 translates upward decreasing the pressure in the accumulator reservoir. The decreased pressure generates a pressure differential that opens the one-way inlet valve 204. The decreased pressure differential draws liquid (e.g., the compound) up through the dip tube 265 from a liquid-containing chamber (or liner). A gasket 240 resides within the body 245 of the cap and the gasket 240 encloses the housing 245. In an example, where the pump assembly cap 200 includes a liner. The liner is coupled to the gasket 240. The housing 245 of the pump assembly cap 200 has a seal valve 250. In an example, the seal valve 250 is movably coupled within the housing 245.

Figure 3:
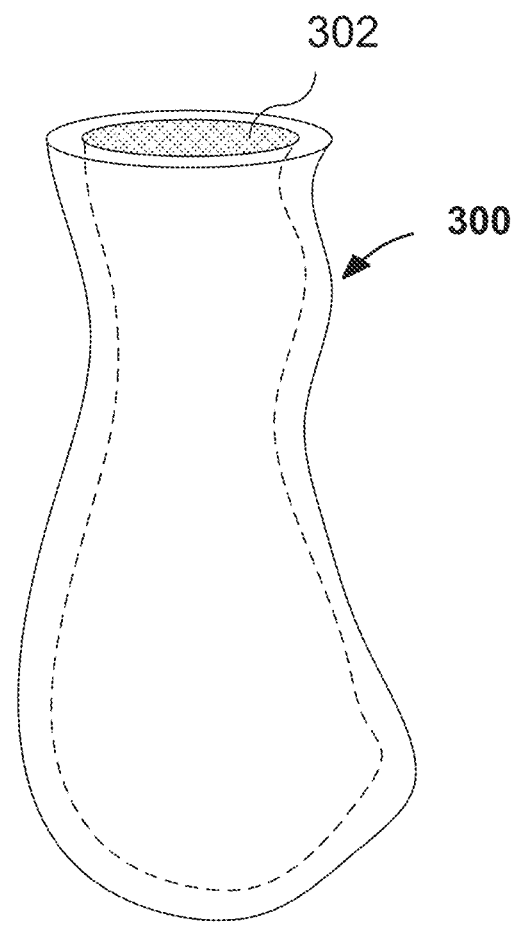
FIG. 3 depicts an example of a liner containing an omega-3 oil, according to an embodiment.

FIG. 3 depicts an example of a hermetically sealed liner 300 containing the compound 302. As shown in the example, the liner 300 is filled to capacity with the compound 302 (e.g., omega-3 composition) so that no air, oxygen or the like occupies the interior of the liner 300. Accordingly, the container includes no "head-space" above the omega-3 composition (e.g., compound 302) and when installed with a pump assembly cap 100, 200 the compound 302 is isolated from atmosphere including oxygen. If a gaseous head-space is desired, a non-oxidizing atmosphere is employed such as $CO_2$, or $N_2$ to reduce or eliminate the presence of oxygen.

The omega-3 compositions described herein contain less than 20% oxidized fatty acids upon delivery (spray) of the composition. In some embodiments, the omega-3 compositions contain less than about 25%, 20%, 15%, 10%, 9%, 8%, 7%, 6%, 5%, 4%, 3%, 2%, 1%, 0.5%, or 0.1% oxidized fatty acids of the total fatty acid content of a spray of the omega-3 composition.

In an example, the liner 300 collapses as the compound (e.g., omega-3 fatty acid liquid composition) is drawn out. Accordingly, the compound 302 is isolated from the atmosphere to reduce spoilage of the compound. The liner 300, can be made from a flexible BPA-free, PVC-free material, where BPA refers to bisphenol A and PVC refers to polyvinyl chloride. For example, the liner can be made of silicone, poly butyl, polyethylene, polypropylene, or the like.

Figure 4A:
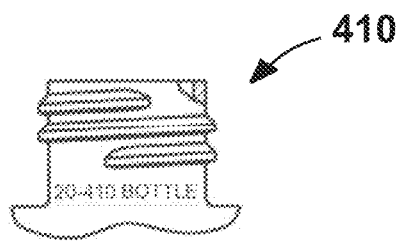
FIG. 4A depicts an example of a container boss configured to couple to a pump assembly cap, according to an embodiment.
Figure 4B:
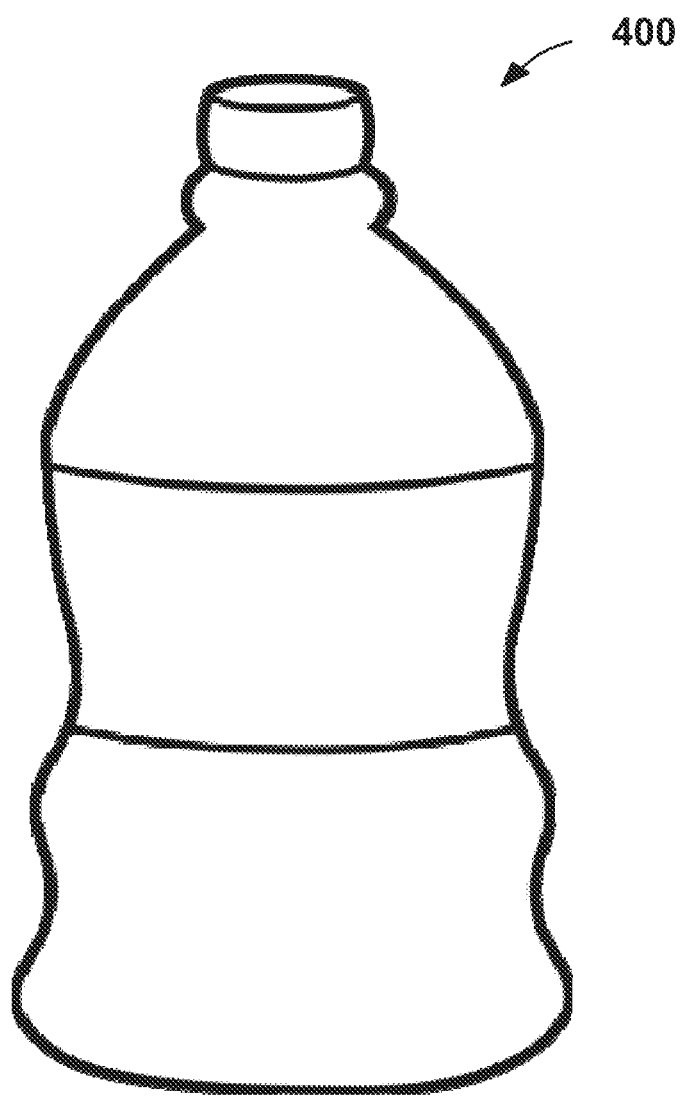
FIG. 4B depicts an example of a container configured to couple to a pump assembly cap, according to an embodiment.

FIG. 4A is an exemplary container coupling 410 configured to couple to a pump assembly cap 100 or 200. For instance, in an example the container coupling 410 is included on container 400 illustrated in FIG. 4B. In a further example, the container coupling 410 is included on the liner 300 to hermetically seal the pump assembly cap 100 to a container 400 or the liner 300. Optionally, the container 400 is deformable in the manner of the liner 300 and is compressed during operation of the pump assembly cap 100, 200. For instance, as the volume of the container 400 decreases (with dispensing of the compound) the container collapses to facilitate further dispensing.

The container 400 can include a bottle having a threaded boss (e.g., raised threads) so that the pump assembly cap 100 can be coupled (e.g., screwed) onto the container 400, for example, as illustrated by the container coupling 410 (e.g., bottle top) shown in FIG. 4A. The container 400 can include a liner, such as the liner 300 shown in FIG. 3. The liner 300 fits within the inside of the container 400.

The following non-limiting examples illustrate development of some aspects of the invention.

EXAMPLE 1

Isolation of DHA from Microalgae

This example described methods for obtaining DHA Algal Oil from microalgae. A flow chart of the manufacturing process is shown in FIG. 5.

Algae (e.g., a *Schizochytrium* species) are grown in a fermenter under aerobic conditions. Such a fermentation process can employ a medium that contains carbon and nitrogen sources, bulk nutrients, trace minerals, and vitamins. All raw materials employed are food grade or better. For example, a fed-batch process can be employed where portions of the carbon and nitrogen sources are added during the initial and later phases of the fermentation.

Following fermentation, crude oil is obtained from the fermentation broth by aqueous extraction. Water is added and the diluted broth is collected in a centrifuge for further processing and pasteurization. Enzymatic degradation of the algal cell walls by a food grade proteases is used to facilitate the release of the oil from the algae, followed by sodium chloride addition and centrifugation. The oil from the centrifuge is collected as the top (light) phase and the spent broth as the lower (heavy) phase. The recovered oil is collected in the oil recovery tank and pumped into a vacuum dryer, where it is dried under maximum vacuum. The separated algal oil then undergoes the standard food oil industry downstream processing operations of filtration, refining, physical bleaching and deodorization.

The oil product is made under appropriate food current good manufacturing practices (cGMPs).

EXAMPLE 2

Different Types of Omega-3 Oils

Different types of omega-3 polyunsaturated triglycerides have been approved for human consumptions. For example, in Europe, Martek Biosciences Corporation (now DSM Nutritional Products) has obtained approval to market a DHA-rich oil produced from *Schizochytrium* that is referred to as DHA-S. Another DHA-rich oil that is made by DSM Nutritional Products includes eicosapentaenoic acid (EPA), which is referred to as DHA-O, and where the EPA is present in the DHA-O composition in about half the amount of the DHA (e.g., 1:2 EPA:DHA). Another DHA-rich oil is made by DSM Nutritional Products using a different species of *Schizochytrium*, and that is referred to as DHA-B.

EXAMPLE 3

Example Compositions of DHA Products

Batches of the DHA-B product as a triglyceride oil were isolated from a *Schizochytrium* microalgae species as described in Example 1, and have the composition shown in Tables 1 and 2.

TABLE 1

DHA-B Composition

| Parameter | Specification | Test Method |
|---|---|---|
| Free fatty acids (%) | Not more than 0.4 | AOCS Ca 5a-40 |
| Peroxide value (meq/kg) | Not more than 5.0 | AOCS Cd 8-53 |
| Unsaponifiables (%) | Not more than 3.5 | AOCS Ca 6b-53 |
| DHA (%) | Not less than 35 | AOCS Ce 1b-89 |
| Trans fatty acids (%) | Not more than 2.0 | AOCS Cd 14-95 |
| Arsenic (mg/kg) | Not more than 0.1 | AOCS Ca 17-01 |
| Cadmium (mg/kg) | Not more than 0.1 | AOCS Ca 17-01 |
| Copper (mg/kg) | Not more than 0.1 | AOCS Ca 17-01 |
| Lead (mg/kg) | Not more than 0.1 | AOCS Ca 17-01 |
| Mercury (mg/kg) | Not more than 0.4 | AOAC 977.15 |

AOCS = American Oil Chemists' Society; DHA = docosahexaenoic acid.

Table 2 illustrates the quality control of different batches of DHA-B compared to DHA-S and DHA-O products.

TABLE 2

Quality Control of DHA-B Manufacturing

| Tests | Spec. | DHA-B Batch No | | | DHA-S REFERENCE ONLY Mean of 2 batches [1] | DHA-O REFERENCE ONLY Mean of 3 batches [2] |
|---|---|---|---|---|---|---|
| | | R223 | 0800006586 | 0800006592 | | |
| Free fatty acids (%) | Not more than 0.4 | 0.07 | 0.05 | 0.07 | N/A | N/A |
| Peroxide value (meq/kg) | Not more than 5.0 | 0.35 | ND | ND | 0.33 | 2.5 |
| Unsaponifiables (%) | Not more than 3.5 | 0.97 | 0.96 | 0.78 | 1.76 | 1.13 |
| DHA (%) | Not less than 35 | 44.35 | 42.65 | 41.23 | 45.8 | 33.7 |
| Trans fatty acids (%) | Not more than 2.0 | <1.0 | <1.0 | <1.0 | <2.0 | <2.0 |
| Arsenic (mg/kg) | Not more than 0.1 | <0.1 | <0.1 | <0.1 | <0.2 | <0.2 |
| Cadmium (mg/kg) | Not more than 0.1 | <0.1 | <0.1 | <0.1 | <0.04 | N/A |
| Copper (mg/kg) | Not more than 0.1 | <0.02 | <0.02 | <0.02 | <0.05 | <0.02 |
| Lead (mg/kg) [a] | Not more than 0.1 | <0.1 | <0.1 | <0.1 | <0.20 | <0.01 |
| Mercury (mg/kg) | Not more than 0.4 | <0.01 | <0.01 | <0.01 | <0.20 | <0.04 |

[1] Calculated as a mean of two batches.
[2] Calculated as a mean of three batches.
[a] Lead limits meet the limits set for "Fats and oils, including milk fat" of 0.10 mg/kg net weight, set is Regulation (EC) No. 1881/2006 of 19 Dec. 2006 setting maximum levels for certain contaminants in foodstuffs (Commission of the European Communities, 2006).

EXAMPLE 4

DHA Spray Product Composition

This Example illustrates an exemplary DHA containing DHA omega-3 and vitamin D3 oil when sprayed from the spray bottle described herein. Table 3 summarizes some of the components in DHA lot no. V015098, the amount of those components, and the test employed to detect the components.

TABLE 3

DHA Spray Composition

| Component | Amount | Test Employed |
|---|---|---|
| Free fatty acid | ND | AOAC 940.28 |
| Peroxide value | 2 meq/Kg | AOAC 965.33 |
| Anisidine value | 6.81 | AOCS Cd 18-90 |

EXAMPLE 5

Stability of DHA Products

This Example illustrates the stability of DHA products over time. Peroxide values were measured over time using the Association of Analytical Chemists (AOAC) methods 965.33. The method is carried out by dissolving the oil sample in a solvent and potassium iodide and then titrating with sodium thiosulfate and using starch as an indicator.

Table 4 illustrates the amount of DHA and the amount of oxidation (peroxide value in meq/kg) present in frozen DHA-B product batches 0980005999 and 080006592 over time.

TABLE 4

Oxidation of DHA-B Product Over Time When Stored Frozen
Table I.B.2-1 Stability of DHA-B under frozen storage conditions

| Lot Number | Specifications | Time (months) | | |
|---|---|---|---|---|
| | | 0 | 6 | 12 |
| DHA (mg/g) | | | | |
| 9800005999 | Min. 35 | 40.7 | 42.5 | 40.1 |
| 0800006592 | | 38.5 | N/A | 40.9 |
| Peroxide Value (meq/kg) | | | | |
| 9800005999 | Max. 5 | <0.1 | <0.1 | <0.1 |
| 0800006592 | | <0.1 | N/A | <0.1 |

DHA = docosahexaenoic acid; N/A = not available.

As illustrated, the DHA product exhibits less than 0.1 meq/Kg in samples for up to 12 months.

EXAMPLE 6

Dispensing DHA Composition into a Spray Container

This Example illustrates procedures for excluding air from being introduced while dispensing compositions into the spray container described herein. Spray containers, container liners, and spray caps are newly manufactured. The liner can be placed within the spray container under sterile conditions. Any volatile chemicals residual from manufacturing (e.g., plasticizers, sealants, solvents, etc.) as well as atmospheric oxygen are removed by placement of the partially assembled spray containers-liner with the spray cap in a closed system under vacuum. A nitrogen atmosphere is introduced into the closed system. The spray container-liner is filled to capacity with the DHA composition and the spray cap is securely affixed. Any small volume of gaseous atmosphere within the spray container is nitrogen.

REFERENCES

1. Muldoon M F, Ryan C M, Sheu L, Yao J K, Conklin S M, et al. (2010) *Serum phospholipid docosahexaenoic acid is associated with cognitive functioning during middle adulthood. The Journal of nutrition* 140: 848-853. doi: 10.3945/jn.109.119578
2. Freund-Levi Y, Eriksdotter-Jonhagen M., Cederholm T., Basun H., Faxen-Irving G, et al. (2006) *Omega-3 fatty acid treatment in 174 patients with mild to moderate Alzheimer disease: OmegAD study: a randomized double-blind trial. Archives of neurology* 63: 1402-1408. doi: 10.1001/archneur.63.10.1402
3. Freund-Levi Y, Basun H, Cederholm T, Faxen-Irving G, Garlind A, et al. (2008) *Omega-3 supplementation in mild to moderate Alzheimer's disease: effects on neuropsychiatric symptoms. International journal of geriatric psychiatry* 23: 161-169. doi: 10.1002/gps.1857
4. Chiu C C, Su K P, Cheng T C, Liu H C, Chang C J, et al. (2008) *The effects of Omega-3 fatty acids monotherapy in Alzheimer's disease and mild cognitive impairment: a preliminary randomized double-blind placebo-controlled study. Progress in neuro psychopharmacology & biological psychiatry* 32: 1538-1544. doi: 10.1016/j.pnpbp.2008.05.015
5. van de Rest O, Geleijnse J M, Kok F J, van Staveren W A, Dullemeijer C, et al. (2008) *Effect of fish oil on cognitive performance in older subjects: a randomized, controlled trial. Neurology* 71: 430-438. doi: 10.1212/01.wnl.0000324268.45138.86
6. Narendran R, Frankle W G, Mason N S, Muldoon M F, Moghaddam B (2012) *Improved Working Memory but No Effect on Striatal Vesicular Monoamine Transporter Type 2 after Omega-3 Polyunsaturated Fatty Acid Supplementation. PLoS ONE* 7(10): e46832. doi: 10.1371/journal.pone.0046832
7. Lassek W D, Gaulin S J C. *Sex Differences in the Relationship of Dietary Fatty Acids to Cognitive Measures in American Children. Frontiers in Evolutionary Neuroscience.* 2011; 3: 5. doi: 10.3389/fnevo.2011.00005.
8. Svennerholm L. (1968). *Distribution and fatty acid composition of phosphoglycerides in normal human brain. J. Lipid Res.* 9, 570-579
9. Rapoport S. I. (2003). *In vivo approaches to quantifying and imaging brain arachidonic and docosahexaenoic acid metabolism. J. Pediatr.* 143, S26-S3410.1016/S0022-3476(03)00182-3
10. Ouellet M., Emond V, Chen C., Julien C., Bourasset F., Oddo S., Laferla F., Bazinet R. P., Calon F. (2009). *Diffusion of docosahexaenoic and eicosapentaenoic acids through the blood-brain barrier: an in situ cerebral perfusion study. Neurochem. Int.* 55, 476.10.1016/j.neuint.2009.04.018
11. Cockburn F. (1994). *Neonatal brain and dietary lipids. Arch. Dis. Child.* 70, F1-F210.1136/adc.70.5.369
12. Jamieson E. C., Farquharson J., Logan R. W., Howatson A. G., Patrick W. J. A., Weaver L. T., Cockburn F. (1999). *Infant cerebellar gray and white matter fatty acids in relation to age and diet. Lipids* 34, 1065-107110.1007/s11745-999-0458-5
13. Salem N., Jr., Moriguchi T., Greiner R. S., Mcbride K., Ahmad A., Catalan J. N., Slotnick B. (2001). *Alterations in brain function after loss of docosahexaenoate due to dietary restriction of n-3 fatty acids. J. Mol. Neurosci.* 16, 299-30710.1385/JMN: 16:2-3: 299
14. Chang C.-Y., Ke D.-S., Chen J.-Y. (2009). *Essential fatty acids and human brain. Acta Neurol. Taiwan.* 18, 231-241
15. Bourre J. M., Francois M., Youyou A., Dumont O., Piciotti M., Pascal G., Durand G. (1989). *The effects of dietary alpha-linolenic acid on the composition of nerve membranes, enzymatic activity, amplitude of electrophysiological parameters, resistance to poisons and performance of learning tasks in rats. J. Nutr.* 119, 1880-1892
16. Turner N., Else P. L., Hulbert A. J. (2003). *Docosahexaenoic acid (DHA) content of membranes deter-* mines molecular activity of the sodium pump: implications for disease states and metabolism. *Naturwissenschaften* 90, 521-52310.1007/s00114-003-0470-z 17. Kumosani T. A., Moselhy S. S., Kumosani T. A., Moselhy S. S. (2011). *Modulatory effect of cod-liver oil on Na(+)-K(+) ATPase in rats' brain. Hum. Exp. Toxicol.* 30, 267-27410.1177/0960327110371699

18. Ahmad A., Moriguchi T., Salem N. (2002). *Decrease in neuron size in docosahexaenoic acid-deficient brain. Pediatr. Neurol.* 26, 210-21810.1016/S0887-8994(01)00383-6

19. Auestad N., Innis S. M. (2000). *Dietary n-3 fatty acid restriction during gestation in rats: neuronal cell body and growth-cone fatty acids. Am. J. Clin. Nutr.* 71, 312S-314S 20. Coti Bertrand P., O'usky I. R., Innis S. M. (2006). *Maternal dietary (n-3) fatty acid deficiency alters neurogenesis in the embryonic rat brain. J. Nutr.* 136, 1570-1575

21. Beltz B. S., Tlusty M. F., Benton J. L., Sandeman D. C. (2007). *Omega-3 fatty acids upregulate adult neurogenesis. Neurosci. Lett.* 415, 154-15810.1016/j.neulet.2007.01.010

22. Novak E. M., Dyer R. A., Innis S. M. (2008). *High dietary omega-6 fatty acids contribute to reduced docosahexaenoic acid in the developing brain and inhibit secondary neurite growth. Brain Res.* 1237, 136-14510.1016/j.brainres.2008.07.107

23. Da Costa K.-A., Rai K. S., Craciunescu C. N., Parikh K., Mehedint M. G., Sanders L. M., Mclean-Pottinger A., Zeisel S. H. (2009). *Dietary docosahexaenoic acid supplementation modulates hippocampal development in the Pemt−/− mouse. J. Biol. Chem.* 285, 1008-101510.1074/jbc.M109.017137

24. Dagai L., Peri-Naor R., Birk R. (2009). *Docosahexaenoic acid significantly stimulates immediate early response genes and neurite outgrowth. Neurochem. Res.* 34, 867-87510.1007/s11064-008-9845-z 25. He C., Qu X., Cui L., Wang J., Kang J. X. (2009). *Improved spatial learning performance of fat-1 mice is associated with enhanced neurogenesis and neuritogenesis by docosahexaenoic acid. Proc. Natl. Acad. Sci. U.S.A.* 106, 11370-1137510.1073/pnas.0906923106

26. Calderon F., Kim H.-Y. (2004). *Docosahexaenoic acid promotes neurite growth in hippocampal neurons. J. Neurochem.* 90, 979-98810.1111/j.1471-4159.2004.02808.x 27. Sakamoto T., Cansev M., Wurtman R. J. (2007). *Oral supplementation with docosahexaenoic acid and uridine-5'-monophosphate increases dendritic spine density in adult gerbil hippocampus. Brain Res.* 1182, 50-5910.1016/j.brainres.2007.08.089

28. Liu J.-W., Almaguel F. G., Bu L., De Leon D. D., De Leon M. (2008). *Expression of E-FABP in PC12 cells increases neurite extension during differentiation: involvement of n-3 and n-6 fatty acids. J. Neurochem.* 106, 2015-202910.1111/j.1471-4159.2008.05411.x 29. Cao D., Kevala K, Kim J., Moon H.-S., Jun S. B., Lovinger D., Kim H.-Y. (2009). *Docosahexaenoic acid promotes hippocampal neuronal development and synaptic function. J. Neurochem.* 111, 510-52110.1111/j.1471-4159.2009.06300.x 30. Yoshida S, Yasuda A., Kawazato H., Sakai K, Shimada T., Takeshita M., Yuasa S., Kobayashi T., Watanabe S., Okuyama H., (1997). *Synaptic vesicle ultrastructural changes in the rat hippocampus induced by a combination of α-linolenate deficiency and a learning task. J. Neurochem.* 68, 1261-126810.1046/j.1471-4159.1997.68031261.x 31. Cansev M., Wurtman R. J. (2007). *Chronic administration of docosahexaenoic acid or eicosapentaenoic acid, but not arachidonic acid, alone or in combination with uridine, increases brain phosphatide and synaptic protein levels in gerbils. Neuroscience* 148, 421-43110.1016/j.neuroscience.2007.06.016

32. Wu A., Ying Z., Gomez-Pinilla F. (2008). *Docosahexaenoic acid dietary supplementation enhances the effects of exercise on synaptic plasticity and cognition. Neuroscience* 155, 751-75910.1016/j.neuroscience.2008.05.061

33. Wurtman R. J., Cansev M., Ulus I. H. (2009). *Synapse formation is enhanced by oral administration of uridine and DHA, the circulating precursors of brain phosphatides. J. Nutr. Health Aging* 13, 189-19710.1007/s12603-009-0056-3

34. Issa A. M., Moijica W. A., Morton S. C., Traina S., Newberry S. J., Hilton L. G., Garland R. H., Maclean C. H. (2006). *The efficacy of Omega-3 fatty acids on cognitive function in aging and dementia: a systematic review. Dement. Geriatr. Cogn. Disord.* 21, 88-9610.1159/000090224

35. Mukherjee P. K., Chawla A., Loayza M. S., Bazan N. G. (2007). *Docosanoids are multifunctional regulators of neural cell integrity and fate: significance in aging and disease. Prostaglandins Leukot Essent. Fatty Acids* 77, 233-23810.1016/j.plefa.2007.10.022

36. Niemoller T. D., Stark D. T., Bazan N. G. (2009). *Omega-3 fatty acid docosahexaenoic acid is the precursor of neuroprotectin D1 in the nervous system. World Rev. Nutr. Diet.* 99, 46-5410.1159/000192994

37. Kitajka K, Puskas L. G., Zvara A., Hackler L. H., Jr., Barcelo-Coblijn G., Yoo Y. K., Farkas T. (2002). *The role of n-3 polyunsaturated fatty acids in brain: modulation of rat brain gene expression by dietary n-3 fatty acids. Proc. Natl. Acad. Sci. U.S.A.* 99, 2619-262410.1073/pnas.042698699

38. Pifferi F., Jouin M., Alessandri J. M., Haedke U., Roux F., Perriere N., Denis I., Lavialle M., Guesnet P. (2007). *N-3 fatty acids modulate brain glucose transport in endothelial cells of the blood-brain barrier. Prostaglandins Leukot. Essent. Fatty Acids* 77, 279-28610.1016/j.plefa.2007.10.01

39. Heinemann K. M., Bauer J. E. (2006). *Docosahexaenoic acid and neurologic development in animals. J. Am. Vet. Med. Assoc.* 228, 700-70510.2460/javma.228.5.700

40. Bongiovanni K. D., Depeters E. J., Van Eenennaam A. L. (2007). *Neonatal growth rate and development of mice raised on milk transgenically enriched with Omega-3 fatty acids. Pediatr. Res.* 62, 412-416

41. Coluccia A., Borracci P., Renna G., Giustino A., Latronico T., Riccio P., Carratu M. R. (2009). *Developmental Omega-3 supplementation improves motor skills in juvenile-adult rats. Int. J. Dev. Neurosci.* 27, 599-60510.1016/j.ijdevneu.2009.05.011

42. Greiner R. S., Moriguchi T., Hutton A., Slotnick B. M., Salem N., Jr. (1999). *Rats with low levels of brain docosahexaenoic acid show impaired performance in olfactory-based and spatial learning tasks. Lipids* 34(Suppl.), S239-S24310.1007/BF02562305

43. Takeuchi T., Fukumoto Y., Harada E. (2002). *Influence of a dietary n-3 fatty acid deficiency on the cerebral*

44. Shirai N., Suzuki H. (2004). *Effect of dietary docosahexaenoic acid and catechins on maze behavior in mice. Ann. Nutr. Metab.* 48, 51-58 10.1159/000075305
45. Garcia-Calatayud S., Redondo C., Martin E., Ruiz J. I., Garcia-Fuentes M., Sanjurjo P. (2005). *Brain docosahexaenoic acid status and learning in young rats submitted to dietary long-chain polyunsaturated fatty acid deficiency and supplementation limited to lactation. Pediatr. Res.* 57, 719-723 10.1203/01.PDR.0000156506.03057.AD
46. Lim S.-Y., Hoshiba J., Moriguchi T., Salem N., Jr. (2005). *N-3 fatty acid deficiency induced by a modified artificial rearing method leads to poorer performance in spatial learning tasks. Pediatr. Res.* 58, 741-748 10.1203/01.PDR.0000180547.46725.CC
47. Chung W. L., Chen J. J., Su H. M. (2008). *Fish oil supplementation of control and (n-3) fatty acid-deficient male rats enhances reference and working memory performance and increases brain regional docosahexaenoic acid levels. J. Nutr.* 138, 1165-1171
48. Holguin S., Huang Y., Liu J., Wurtman R. (2008). *Chronic administration of DHA and UMP improves the impaired memory of environmentally impoverished rats. Behav. Brain Res.* 191, 11-16 10.1016/j.bbr.2008.02.042
49. Fedorova I., Hussein N., Baumann M. H., Di Martino C., Salem N., Jr. (2009). *An n-3 fatty acid deficiency impairs rat spatial learning in the Barnes maze. Behav. Neurosci.* 123, 196-205 10.1037/a0013801
50. Hooijmans C. R., Van Der Zee C. E., Dederen P. J., Brouwer K. M., Reijmer Y. D., Van Groen T., Broersen L. M., Lutjohann D., Heerschap A., Kiliaan A. J., Van Der Zee C. E. E. M. (2009). *DHA and cholesterol containing diets influence Alzheimer-like pathology, cognition and cerebral vasculature in APPswe/PS1dE9 mice. Neurobiol. Dis.* 33, 482-498 10.1016/j.nbd.2008.12.002
51. Jiang L.-H., Shi Y., Wang L.-S., Yang Z.-R. (2009). *The influence of orally administered docosahexaenoic acid on cognitive ability in aged mice. J. Nutr. Biochem.* 20, 735-741 10.1016/j.jnutbio.2008.08.004
52. Nealen P M. *Three Billion Years of Fatty Acid Metabolism Shape Human Cognitive Performance. Frontiers in Evolutionary Neuroscience.* 2011; 3:6. doi:10.3389/fnevo.2011.00006.
53. Fernstrom J. D. (1999). *Effects of dietary polyunsaturated fatty acids on neuronal function. Lipids* 34, 161-169 10.1007/s11745-999-0350-3
54. Schmitz G., Ecker J. (2008). *The opposing effects of n-3 and n-6 fatty acids. Prog. Lipid Res.* 47, 147-155 10.1016/j.plipres.2007.12.004
55. Maillet D., Weber J. M. (2007). *Relationship between n-3 PUFA content and energy metabolism in the flight muscles of a migrating shorebird: evidence for natural doping. J. Exp. Biol.* 210, 413-420 10.1242/jeb.02660
56. Bordoni A., Di Nunzio M., Danesi F., Biagi P. L. (2006). *Polyunsaturated fatty acids: from diet to binding to ppars and other nuclear receptors. Genes Nutr.* 1, 95-106 10.1007/BF02829951
57. Hoffman D. R., Boettcher J. A., Diersen-Schade D. A. (2009). *Toward optimizing vision and cognition in term infants by dietary docosahexaenoic and arachidonic acid supplementation: a review of randomized controlled trials. Prostaglandins Leukot. Essent. Fatty Acids* 81, 151-158 10.1016/j.plefa.2009.05.003
58. Leung B. M., Wiens K. P., Kaplan B. J. (2011). *Does prenatal micronutrient supplementation improve children's mental development? A systematic review. BMC Pregnancy Childbirth* 11, 12.10.1186/1471-2393-11-12
59. Muhlhausler B. S., Gibson R. A., Makrides M. (2011). *The effect of maternal Omega-3 long-chain polyunsaturated fatty acid (n-3 LCPUFA) supplementation during pregnancy and/or lactation on body fat mass in the offspring: a systematic review of animal studies. Prostaglandins Leukot. Essent. Fatty Acids* 85, 83-88 10.1016/j.plefa.2011.04.027
60. Salvig J. D., Lamont R. F. (2011). *Evidence regarding an effect of marine n-3 fatty acids on preterm birth: a systematic review and meta-analysis. Acta Obstet. Gynecol. Scand.* 90, 825-838 10.1111/j.1600-0412.2011.01171.x
61. Calder P C. *Marine Omega-3 fatty acids and inflammatory processes: effects, mechanisms and clinical relevance. Biochim Biophys Acta.* 2014; 1851(4): 469-484.
62. Leaf A. *Prevention of sudden cardiac death by n-3 polyunsaturated fatty acids. J Cardiovasc Med. (Hagerstown).* 2007; 8 Suppl 1:S27-29.
63. *Dietary supplementation with n-3 polyunsaturated fatty acids and vitamin E after myocardial infarction: results of the GISSI-Prevenzione trial. Gruppo Italiano per lo Studio della Sopravvivenza nell'Infarto miocardico. Lancet.* 1999; 354:447-55.
64. Yokoyama M, Origasa H, Matsuzaki M, et al. *Effects of eicosapentaenoic acid on major coronary events in hypercholesterolaemic patients (JELIS): a randomised open-label, blinded endpoint analysis. Lancet.* 2007; 369:1090-98.
65. Willett W C. *The role of dietary n-6 fatty acids in the prevention of cardiovascular disease. J Cardiovasc Med. (Hagerstown).* 2007; 8 Suppl 1:S42-5.
66. Mozaffarian D, Ascherio A, Hu F B, et al. *Interplay between different polyunsaturated fatty acids and risk of coronary heart disease in men. Circulation.* 2005; 111:157-64.
67. Leitzmann M F, Stampfer M I Michaud D S, et al. *Dietary intake of n-3 and n-6 fatty acids and the risk of prostate cancer. Am J Clin Nutr.* 2004; 80:204-16.
68. Koralek D O, Peters U, Andriole G, et al. *A prospective study of dietary alpha-linolenic acid and the risk of prostate cancer (United States). Cancer Causes Control.* 2006; 17:783-91.
69. Eilander A, Hundscheid D C, Osendarp S J, Transler C, Zock P L. *Effects of n-3 long chain polyunsaturated fatty acid supplementation on visual and cognitive development throughout childhood: a review of human studies. Prostaglandins Leukot Essent Fatty Acids.* 2007; 76: 189-203.
70. Oken E, Kleinman K P, Berland W E, Simon S R, Rich-Edwards J W Gillman M W. *Decline in fish consumption among pregnant women after a national mercury advisory. Obstet Gynecol.* 2003; 102: 346-51.
71. *Omega-3 Fatty Acids: An Essential Contribution." The Nutrition Source.* Harvard School of Public Health. 2014.
72. Estrada, Andrea. *"Hold the Mayo." The UCSB Current.* University of California Santa Barbara, 9 Sep. 2014.

73. DiSalvo, David. "*New Study Shows That Omega-3 Supplements Can Boost Memory in Young Adults.*" Forbes. Forbes Magazine, 29 Oct. 2012.
74. "*Low Omega-3 Could Explain Why Some Children Struggle with Reading.*" Low Omega-3 Could Explain Why Some Children Struggle with Reading. University of Oxford, 5 Sep. 2013.
75. Castillo, Michelle. "*High Levels of Omega-3 Fatty Acids Linked to Larger Brain Volume in Older Adults.*" CBSNews. CBS Interactive, 22 Jan. 2014.
76. Stough C, Downey L, Silber B, Lloyd J, Kure C, et al. (2012) *The effects of 90-day supplementation with the Omega-3 essential fatty acid docosahexaenoic acid (DHA) on cognitive function and visual acuity in a healthy aging population. Neurobiology of aging* 33: 824 e821-823.
77. *Seafood Choices: Balancing Risks and Benefits. Institute of Medicine: Washington, D.C.,* 2007.
78. Mozaffarian D, Rimm E B. *Fish intake, contaminants, and human health: evaluating the risks and the benefits.* JAMA. 2006; 296:1885-99.
79. Kris-Etherton P M, Harris W S, Appel L J. *Fish consumption, fish oil, Omega-3 fatty acids, and cardiovascular disease.* Circulation. 2002; 106:2747-57.
80. Grandjean P, Weihe P, White R F, et al. *Cognitive deficit in 7-year-old children with prenatal exposure to methylmercury. Neurotoxicol Teratol.* 1997; 19:417-28.
81. Grandjean P, Weihe P, White R E, et al. *Cognitive deficit in 7-year-old children with prenatal exposure to methylmercury. Neurotoxicol Teratol.* 1997; 19: 417-28.
82. Oken E, Wright R O, Kleinman K P, et al. *Maternal fish consumption, hair mercury, and infant cognition in a U.S. Cohort. Environ Health Perspect.* 2005; 113: 1376-80.
83. Mozaffarian D, Ascherio A, Hu F B, et al. *Interplay between different polyunsaturated fatty acids and risk of coronary heart disease in men. Circulation.* 2005; 111: 157-64.
84. Raji C A, Erikson K I, Lopez O L, Kuller L H, Gach H M, Thompson P M Riverol M, Becker J T. *Regular fish consumption and age-related brain gray matter loss. Am J. of Prev Med.* 2014; 47(4): 444-51
85. Vaisman N, Kaysar N, Zaruk-Adasha Y, et al. *Correlation between changes in blood fatty acid composition and visual sustained attention performance in children with inattention: effect of dietary n-3 fatty acids containing phospholipids. Am J Clin Nutr.* 2008; 87: 1170-80.
86. Kidd P M. *Omega-3 DHA and EPA for cognition, behavior, and mood: clinical findings and structural-functional synergies with cell membrane phospholipids. Altern Med Rev.* 2007 September; 12(3): 207-27.
87. Blondeau N, Pétrault O, Manta S, Giordanengo V, Gounon P, Bordet R, Lazdunski M, Heurteaux C. *Polyunsaturated fatty acids are cerebral vasodilators via the TREK-1 potassium channel. Circ Res.* 2007 Jul. 20; 101(2): 176-84.
88. Pottala J V, Yaffe K, Robinson J G, Espeland M A, Wallace R, Harris W S. *Higher RBC EPA+DHA corresponds with larger total brain and hippocampal volumes: WHIMS-MRI Study. Neurology.* 2014 Jan. 22.
89. Perez M A, Terreros G, Dagnino-Subiabre A. *Long-term Omega-3 fatty acid supplementation induces anti-stress effects and improves learning in rats. Behav Brain Funct.* 2013 Jun. 14; 9(1): 25.
90. Hayakawa S, Yoshikawa D, Ishii H, et al. *Association of plasma Omega-3 to omega-6 polyunsaturated fatty acid ratio with complexity of coronary artery lesion. Intern Med.* 2012; 51(9): 1009-14.
91. Huang T, Shou T, Cai N, Wahlqvist M L, Li D. *Associations of plasma n-3 polyunsaturated fatty acids with blood pressure and cardiovascular risk factors among Chinese. Int J Food Sci Nutr.* 2012 September; 63(6): 667-73.
92. Wu J H, Lemaitre R N, King I B, et al. *Association of plasma phospholipid long-chain Omega-3 fatty acids with incident atrial fibrillation in older adults: the cardiovascular health study. Circulation.* 2012 Mar. 6; 125(9): 1084-93.
93. Hara M, Sakata Y, Nakatani D, et al. *Low levels of serum n-3 polyunsaturated fatty acids are associated with worse heart failure free survival in patients after acute myocardial infarction. Circ J.* 2013; 77(1): 153-62.
94. Hoshi T, Wissuwa B, Tian Y, et al. *Omega-3 fatty acids lower blood pressure by directly activating large-conductance Ca(2)(+)-dependent K(+) channels. Proc Natl Acad Sci USA.* 2013 Mar. 19; 110(12): 4816-21.
95. Bozcali E, Babalik E, Himmetoglu S, Mihmanli I, Toprak S. *Omega-3 fatty acid treatment in cardiac syndrome X: a double-blind, randomized, placebo-controlled clinical study. Coron Artery Dis.* 2013 June; 24(4): 328-33.
96. Wong A T, Chan D C, Barrett P H, Adams L A, Watts G F. *Supplementation with n3 fatty acid ethyl esters increases large and small artery elasticity in obese adults on a weight loss diet. J Nutr.* 2013 April; 143(4): 437-41.
97. Ebrahimi M, Ghayour-Mobarhan M, Rezaiean S, et al. *Omega-3 fatty acid supplements improve the cardiovascular risk profile of subjects with metabolic syndrome, including markers of inflammation and auto-immunity. Acta Cardiol.* 2009 June; 64(3): 321-7.
98. Tandy S, Chung R W, Wat E, et al. *Dietary krill oil supplementation reduces hepatic steatosis, glycemia, and hypercholesterolemia in high-fat-fed mice. J Agric Food Chem.* 2009 Oct. 14; 57(19): 9339-45.
99. Marik P E, Varon J. *Omega-3 dietary supplements and the risk of cardiovascular events: a systematic review. Clin Cardiol.* 2009 July; 32(7): 365-72.
100. "*Fish: Friend or Foe?*" *The Nutrition Source*. Harvard School of Public Health, n.d.
101. "*Higher Levels of Omega-3 in Diet Associated with Better Sleep*" News & Events. University of Oxford, 6 Mar. 2014.
102. Simopoulos A P (2008) *The importance of the omega-6/Omega-3 fatty acid ratio in cardiovascular disease and other chronic diseases. Exp Biol Med* 233: 674-688. doi: 10.3181/0711-MR-311. pmid: 18408140

All patents and publications referenced or mentioned herein are indicative of the levels of skills of those skilled in the art to which the invention pertains, and each referenced patent or publication is hereby specifically incorporated herein by reference in its entirety. Applicants reserve the right to physically incorporate any and all materials, text, and information from any such cited patents or publications into this specification.

VARIOUS NOTES & EXAMPLES

Each of these non-limiting examples may stand on its own, or may be combined in various permutations or combinations with one or more of the other examples. To better illustrate the method and apparatuses disclosed herein, a non-limiting list of embodiments is provided here:

Example 1 is a spray apparatus comprising: an omega-3 composition in liquid form; a container with a compressing pump for ejecting the omega-3 composition in a mist form through a nozzle; and a nozzle adapted with a seal to prevent air or oxygen, outside of the container, from contaminating the omega-3 composition prior to its ejection through the nozzle.

In Example 2, the subject matter of Example 1 optionally includes wherein the compressing pump comprises a poppet and a piston.

In Example 3, the subject matter of any one or more of Examples 1-2 optionally include wherein the apparatus comprises a liner within the container.

In Example 4, the subject matter of any one or more of Examples 1-3 optionally include wherein the apparatus comprises a liner filled to capacity with the omega-3 composition so that no air or oxygen occupies any of the interior of the liner and container.

In Example 5, the subject matter of any one or more of Examples 1-4 optionally include wherein the omega-3 fatty acids in the omega-3 composition are from marine microalgae.

In Example 6, the subject matter of any one or more of Examples 1-5 optionally include wherein the omega-3 fatty acids in the omega-3 composition are from *Schizochytrium* spp., *Parietochloris* spp., *Rhodomonas* spp., *Cryptomonas* spp., *Parietochloris* spp., *Hemisebnis* spp.; *Porphyridium* spp., *Glossomastix* spp., *Crypthecodinium* sp. (e.g., *Crypthecodinium cohnii*), *Thraustochytrium* sp., and/or mixtures thereof.

In Example 7, the subject matter of any one or more of Examples 1-6 optionally include wherein the omega-3 composition contains fatty acids comprising at least about 30% DHA by weight, or 40% DHA by weight, or 50% DHA by weight, or 60% DHA by weight, or 70% DHA by weight, or 80% DHA by weight, or 90% DHA by weight, or at least about 95% DHA by weight.

In Example 8, the subject matter of any one or more of Examples 1-7 optionally include wherein the omega-3 composition contains fatty acids comprise at least about 5% ALA, at least about 10% ALA, at least about 15% ALA, at least about 20% ALA, at least about 25% ALA of the total fatty acid content of the lipid composition.

In Example 9, the subject matter of any one or more of Examples 1-8 optionally include wherein the omega-3 composition contains fatty acids comprise less than about 35% ALA, less than about 30% ALA, less than about 25% ALA, less than about 20% ALA, less than about 15% ALA of the total fatty acid content of the lipid composition.

The specific compositions, apparatuses, and processes described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and the methods and processes are not necessarily restricted to the orders of steps indicated herein or in the claims.

As used herein and in the appended claims, the singular forms "a," "an," and "the" include plural reference unless the context clearly dictates otherwise. Thus, for example, a reference to "a compound," "a fatty acid," "a component" or "a composition" includes a plurality of such compounds, fatty acids, components, or compositions (for example, a solution of compounds, fatty acids, components, or compositions; a suspension of compounds, or a series of components or compounds; or a series of compositions), and so forth. Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims and statements of the invention.

What is claimed is:

1. A pump assembly cap comprising:
an accumulator reservoir configured for fluid communication with a container through a one-way inlet valve coupled with the accumulator reservoir;
an actuator, the actuator includes a dispensing passage configured for fluid communication with the accumulator reservoir through a one-way outlet valve coupled with the accumulator reservoir, the dispensing passage extends from the one-way outlet valve to a dispensing orifice, the actuator includes a tapered seat, and wherein the actuator is movable between a ready position and a dispensing position;
a delivery path extended from the one-way inlet valve, through the accumulator reservoir and the one-way outlet valve, and to the dispensing orifice, the delivery path includes a sealed configuration and an opened configuration, wherein
in the sealed configuration, the actuator is in the ready position and the accumulator reservoir includes a first volume, the one-way outlet valve is seated against the tapered seat, the tapered seat biases and deforms the one-way outlet valve to hermetically seal the accumulator reservoir, and the one-way inlet valve is closed, and
in the opened configuration, the actuator is moved to the dispensing position and the accumulator reservoir includes a second volume less than the first volume and an elevated pressure, the one-way outlet valve overcomes the bias of the tapered seat with the elevated pressure to open the hermetic seal of the one-way outlet valve, and the one-way inlet valve is closed.

2. The pump assembly cap of claim 1, wherein the delivery path further comprises a filling configuration, and in the filling configuration the one-way inlet valve is open and the one-way outlet valve is hermetically sealed.

3. The pump assembly cap of claim 1, wherein the accumulator reservoir includes an inner bore extended from a first end to a second end of the accumulator reservoir and the actuator is movable within the inner bore between the ready position and the dispensing position.

4. The pump assembly cap of claim 1, wherein the one-way outlet valve is a duckbill valve.

5. The pump assembly cap of claim 4, further comprising a poppet located within the inner bore and between the actuator and the second end of the accumulator reservoir, the poppet including an inlet end and an outlet end, wherein the duckbill valve is located at the outlet end.

6. The pump assembly cap of claim 5, wherein a bias element is located between the second end of the accumulator reservoir and the inlet end of the poppet, and the bias element biases the poppet toward the actuator and biases the actuator toward the ready position.

7. The pump assembly cap of claim 1, wherein the one-way outlet valve is adjusted from the hermetically sealed configuration to the dispensing configuration by increasing pressure within the accumulator reservoir from a storage pressure to an opening pressure, the increase in pressure corresponding to a decrease in accumulator volume from the first volume to the second volume.

8. The pump assembly cap of claim 7, wherein the one-way outlet valve is hermetically sealed where the pressure within the accumulator reservoir is above atmospheric, but below the opening pressure.

9. The pump assembly cap of claim 1, wherein the accumulator reservoir is hermetically sealed and is configured to store an omega-3 compound in liquid form, the hermetically sealed accumulator reservoir isolates the omega-3 compound from atmosphere.

10. The pump assembly cap of claim 9, wherein the Omega-3 compound is marine-based Omega-3 oil.

11. The pump assembly cap of claim 9, wherein in the sealed configuration, the omega-3 compound is hermetically sealed within the accumulator reservoir by the one-way outlet valve, in the opened configuration, a portion of the omega-3 compound is ejected from the accumulator reservoir along the delivery path and through the dispensing orifice, and in a filling configuration, the accumulator reservoir is filled with omega-3 compound through the one-way inlet valve.

12. The pump assembly cap of claim 1, further comprising a closure coupled to the accumulator reservoir.

13. The pump assembly cap of claim 12, wherein the closure couples the pump assembly cap to a container configured to hold a liquid compound.

14. The pump assembly cap of claim 13, wherein the container includes a hermetically sealed liner, wherein the hermetically sealed liner is deformable as a volume of the liquid compound decreases with each movement of the actuator to the dispensing position.

15. The pump assembly cap of claim 14, wherein the liner is filled to capacity with the omega-3 composition so that no air or oxygen occupies any of the interior of the liner and container.

16. A pump assembly cap comprising:
a housing including an accumulator reservoir, the housing including an inner bore extended between a first end and a second end;
a poppet movably coupled within the inner bore and including an inlet end and an outlet end, wherein the poppet is movable between a primed position and a discharging position;
a bias element located between the first end of the housing and the inlet end of the poppet, wherein the bias element biases the poppet toward the primed position;
a one-way outlet valve including a dispensing configuration and a hermetically sealed configuration, wherein the one-way outlet valve is located at the outlet end of the poppet;
a one-way inlet valve coupled to the accumulator reservoir, the one-way inlet valve including an open configuration and a closed configuration; and
an actuator in contact with the outlet end, wherein the actuator is movably coupled to the housing, and the actuator includes ready and dispensing positions, wherein
in the ready position, the one-way outlet valve is seated against a tapered seat of the actuator and the tapered seat biases and deforms the one-way outlet valve into a hermetic seal and the one-way inlet valve is in the closed configuration, the poppet is in the primed position, and an omega-3 compound in liquid form is within the hermetically sealed accumulator reservoir, wherein the accumulator reservoir includes a first volume, and
in the dispensing position, the actuator is moved from the ready position toward the dispensing position and the poppet is moved from the primed position to the discharging position, the accumulator reservoir includes a second volume smaller than the first volume and an elevated pressure, and the one-way outlet valve overcomes the bias of the tapered seat with the elevated pressure to open the hermetic seal, and the one-way inlet valve is in the closed configuration.

17. The pump assembly cap of claim 16, wherein the one-way outlet valve is a duckbill valve.

18. The pump assembly cap of claim 16, further including a piston located between the actuator and the poppet.

19. The pump assembly cap of claim 16, wherein the one-way inlet valve includes a ball valve.

20. The pump assembly cap of claim 16, further comprising a closure coupled to the second end of the housing.

21. The pump assembly cap of claim 20, wherein the closure couples the pump assembly cap to a container configured to hold a liquid compound.

22. The pump assembly cap of claim 21, wherein the container includes a hermetically sealed liner, wherein the hermetically sealed liner is deformable as a volume of the liquid compound decreases with each movement of the actuator to the dispensing position.

23. The pump assembly cap of claim 22, wherein the hermetically sealed liner is filled to capacity with the omega-3 compound in liquid form, the hermetically sealed accumulator reservoir isolates the omega-3 compound from atmosphere.

24. The pump assembly cap of claim 16, wherein the Omega-3 compound is marine-based Omega-3 oil.

25. The pump assembly cap of claim 16, wherein the actuator includes a filling position, wherein the actuator is located between the dispensing position and the ready position, and the poppet is located between the primed position and the discharging position, and wherein the one-way outlet valve is in the sealed configuration and the one-way inlet valve is in the open configuration.

26. The pump assembly cap of claim 16, further comprising a delivery path extended from the one-way inlet valve, through the inner bore and the one-way outlet valve, and to the dispensing orifice.

* * * * *